(12) United States Patent
Kulkarni et al.

(10) Patent No.: US 6,360,026 B1
(45) Date of Patent: Mar. 19, 2002

(54) METHOD FOR DETERMINING A SKEW ANGLE OF A BITMAP IMAGE AND DE-SKEWING AND AUTO-CROPPING THE BITMAP IMAGE

(75) Inventors: Manish Kulkarni, Sunnyvale; Timothy L. Kohler, San Jose, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/037,343

(22) Filed: Mar. 10, 1998

(51) Int. Cl.[7] .................................................. G06K 9/36
(52) U.S. Cl. ...................................... 382/289; 382/296
(58) Field of Search ................................ 382/289, 296; 345/437, 438

(56) References Cited

U.S. PATENT DOCUMENTS

| | | | |
|---|---|---|---|
| 4,387,435 A | 6/1983 | Arai et al. ................. 364/514 |
| 4,953,230 A | 8/1990 | Kurose .......................... 382/46 |
| 5,027,227 A | 6/1991 | Kita ............................. 358/488 |
| 5,181,260 A | 1/1993 | Kurousu et al. .............. 382/46 |
| 5,191,438 A | 3/1993 | Katsurada et al. .......... 358/426 |
| 5,384,621 A | 1/1995 | Hatch et al. ................. 355/204 |
| 5,410,417 A | 4/1995 | Kuzinicki et al. .......... 358/426 |
| 5,414,534 A | 5/1995 | Bindon ........................ 358/483 |
| 5,452,374 A | 9/1995 | Cullen et al. ............... 382/293 |
| 5,506,918 A * | 4/1996 | Ishtani ........................ 382/289 |
| 5,528,387 A | 6/1996 | Kelly et al. ................. 358/488 |
| 5,594,556 A | 1/1997 | Vronsky et al. ............. 358/482 |
| 5,901,253 A * | 5/1999 | Trepper ....................... 382/289 |

OTHER PUBLICATIONS

Bunting, Fred "OFOTO User Manual", Second Edition, Nov. 1993, pp. 1–17, 79–99.
Bunting, Fred "OFOTO User Manual", Third Edition, Jul. 1993, pp. 1–18, 49–75.

* cited by examiner

*Primary Examiner*—Yon J. Couso
(74) *Attorney, Agent, or Firm*—Fitzpatrick, Cella, Harper & Scinto

(57) ABSTRACT

Determining a skew angle of a bitmap image comprising of background and image pixels and de-skewing the bitmap image by the determined skew angle. The bitmap image skew angle is determined by calculating plural estimates of the skew angle with corresponding reliability indicators and thereafter selecting the estimate skew angle with the best reliability indicator as the bitmap image skew angle and then de-skew the bitmap image by the determined skew angle. Thereafter, auto-cropping the de-skewed image around a rectangle defined by a first and last column and first and last row of pixels which are not all white.

84 Claims, 13 Drawing Sheets

SKEWED IMAGE

METHOD FOR DETERMINING A SKEW ANGLE OF A BITMAP IMAGE AND DE-SKEWING AND AUTO-CROPPING THE BITMAP IMAGE

BACKGROUND OF THE INVENTION

1. Field of the Invention

The present invention relates to computerized image processing and more particularly to determining the skew angle of an original bitmap image and de-skewing and auto-copping the bitmap image.

2. Description of the Related Art

A raster or bitmap image is usually represented in a digital image processing system by a rectangular grid of pixels, where the pixel is a basic discrete unit for defining bitmap images and has a defined location and color value. A 24 bit digital image system may be defined by three channels comprising of Red (R), Green(G) and Blue (B), where each channel of color contains 8 bits of information with a range of 0 to 255. However, the image is sometimes skewed or misaligned with respect to the rectangular grid. This may occur during the scanning process, which converts physical scenes or images into binary information and thereby links a physical image to a digital computer system. The bitmap image will be skewed if the original image is skewed relative to the scanner platen or when the image is misfed, during the scanning process.

Another way that the bitmap image might be skewed relative to the grid of pixels is where, the original image itself is skewed with respect to the paper. This may occur if the image is photocopied onto to a sheet of paper, which is later used for scanning. The image gets skewed during the photocopying process and hence remains skewed after scanning. FIG. 3a provides an example of a perfectly aligned bitmap image in which 101 is the rectangular grid of pixels, and 102 are pixels representing bitmap image data of an original image and FIG. 3b shows a skewed bitmap image as 103.

Another related problem is presence of background pixels with the image pixels, after an image is scanned as shown in FIG. 3a or 3b. This occurs when the image is copied on a sheet of paper and occupies a smaller area than the sheet itself. The scanner scans the entire sheet and the resulting bitmap image then has both image and background pixels. A user may not need the background pixels and hence there is a need to crop the scanned image.

Various techniques have been proposed for determining a skew angle, de-skewing and auto-cropping a bitmap image, which is comprised of both background and image pixels. However, each has its own problems and limitations. For example, some conventional techniques are computationally intensive, while others work well only with certain types of images, such as a text image, but not with other type of images. Some others correct only errors where the entire image is skewed relative to the grid and not to the paper itself. Others only straighten the image and fail to auto-crop the image from the background pixels. Hence there is a need to straighten the skewed bitmap image as well as auto-crop the image area from the background, so that a user can process a straight image without excessive background pixels.

SUMMARY OF THE INVENTION

It is one object of the present invention to address the disadvantages found in conventional techniques for determining a skew angle of a bitmap image and de-skeweing the bitmap image by the determined skew angle, and to address these disadvantages by determining a bitmap image skew angle by a simple process which is not taxing on computer performance and is independent of image type.

It is another object of the invention to provide an auto-cropping technique which automatically auto-crops a bitmap image, by a process which is accurate and is not computationally intensive.

In one aspect, the invention is the determination of a bitmap image skew angle, where the bitmap image is comprised of background and image pixels. The bitmap image skew angle is determined by calculating a first estimate of the skew angle for a first side of the bitmap image and a corresponding first reliability indicator, the first estimate of the skew angle being based upon the position of image pixels closest to the first side at a plurality of positions along the first side. Thereafter, a second estimate of the skew angle is calculated for the second side with a corresponding second reliability indicator. The second estimate of the skew angle is based upon the position of image pixels closest to the second side at a plurality of positions along the second side. Finally, the bitmap image skew angle is determined in accordance with which of the first and second has the better reliability indicator and the bitmap image may be de-skewed by the determined skew angle.

The first estimate of the skew angle may be determined by calculating a first set of plural angles by inverse tangent, based upon the positions of the image pixels closest to the first side at a plurality of positions along the first side. Thereafter, a mean of the first set of plural angles is calculated as the first estimate of the bitmap image skew angle. Furthermore, a first standard deviation of the first set of plural angles is calculated, wherein the first standard deviation is the reliability indicator for the first estimate of the skew angle.

Similarly, the second estimate of the skew may be determined by calculating a second set of plural angles by inverse tangent, based upon the positions of the image pixels closest to the second side at a plurality of positions along the second side. A mean of the second set of plural angles is calculated and is the second estimate of the bitmap image skew angle, and then a second standard deviation of the second set of plural angles is calculated, wherein the second standard deviation is the reliability indicator for the second estimate of the skew angle.

The least standard deviation from among the first and second standard deviation is the best reliability indicator and the mean angle corresponding to the least standard deviation is chosen as the bitmap image skew angle. It is noteworthy that instead of using the mean angle corresponding to the best reliability indicator, the minimum angle among the first or second set of plural angles, corresponding to the least standard deviation may be chosen as the bitmap image skew angle.

As described above, instead of only using the first and second estimates of the bitmap image skew angles, a third and fourth estimate of the skew angle may also be used, along with the first and second estimates. The third and fourth estimates are based upon the position of image pixels closest to the third and fourth side respectively, at a plurality of positions and have corresponding third and fourth reliability indicators. The third and fourth estimates of the bitmap image skew angle are determined by calculating a third and fourth set of plural angles by inverse tangent and thereafter by calculating a mean of the third and fourth set of plural angles. The third and fourth reliability indicators are determined by calculating the standard deviations of the third and fourth set of plural angles.

The plural estimates of the bitmap skew angle may also be determined by obtaining plural set of points encountered when a set of parallel lines are traversed in a defined direction from background to image pixels. The set of points provide plural set of angles derived from the set of points, wherein the plural angles may be calculated by inverse tangent and estimates of reliability may be based upon standard deviations of the plural set of angles. For example, the first estimate of skew angle is determined by first obtaining a first set of points, wherein the first set of points comprises of image pixels first encountered when a set of parallel lines are traversed in a first direction from background pixels to image pixels. The first set of plural angles are derived from the first set of points by inverse tangent and the mean of the first set of plural angles may be used as the first estimate of the bitmap image skew angle. Thereafter, a standard deviation of the first set of plural angles is calculated and is the first reliability indicator of the first estimate of the skew angle. Similarly, the second, third and fourth estimates of the bitmap image skew angle may be calculated with corresponding reliability indicators.

As described above, the bitmap image is comprised of background and image pixels. The background pixels may be white and the image pixels may not all be white. Furthermore, the background pixels may be non-white and then the image pixels are of a different color than the background pixels.

Prior to determining the bitmap image skew angle, the bitmap image may be pre-processed by applying a filter, wherein the filter may be a median filter. Furthermore, to improve performance, the bitmap image may also be sub-sampled, prior to determining the bitmap image skew angle.

Some of the advantages of the first aspect of the invention are that it is not computationally intensive. Furthermore, the invention is equally effective with any type of image, text or graphics.

In another aspect, the invention auto-crops a bitmap image comprised of background and image pixels so that image pixels may be separated from background pixels. The first and last column of the bitmap image that is not all white is determined. Thereafter, the first and last row of the bitmap image that is not all white is determined. The first and last column, and the first and last row of pixels, which are not all white, define a rectangle. Finally the image is cropped by the defined rectangle.

The auto-cropped bitmap image comprises of background and image pixels. The background pixels may be white and the image pixels may not all be white. Furthermore, the background pixels may be non-white and then the image pixels are of a different color than the background pixels.

Prior to auto cropping the bitmap image, the image is de-skewed by a pre-determined bitmap image skew angle, as described above. Furthermore, prior to auto cropping, the bitmap image may also be pre-processed by applying a filter, wherein the filter may be a median filter and also sub-sampled for improving performance.

The second aspect of the invention automatically crops a bitmap image and hence separates the image pixels from the background pixels. The second aspect is also not computationally taxing and is highly accurate.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
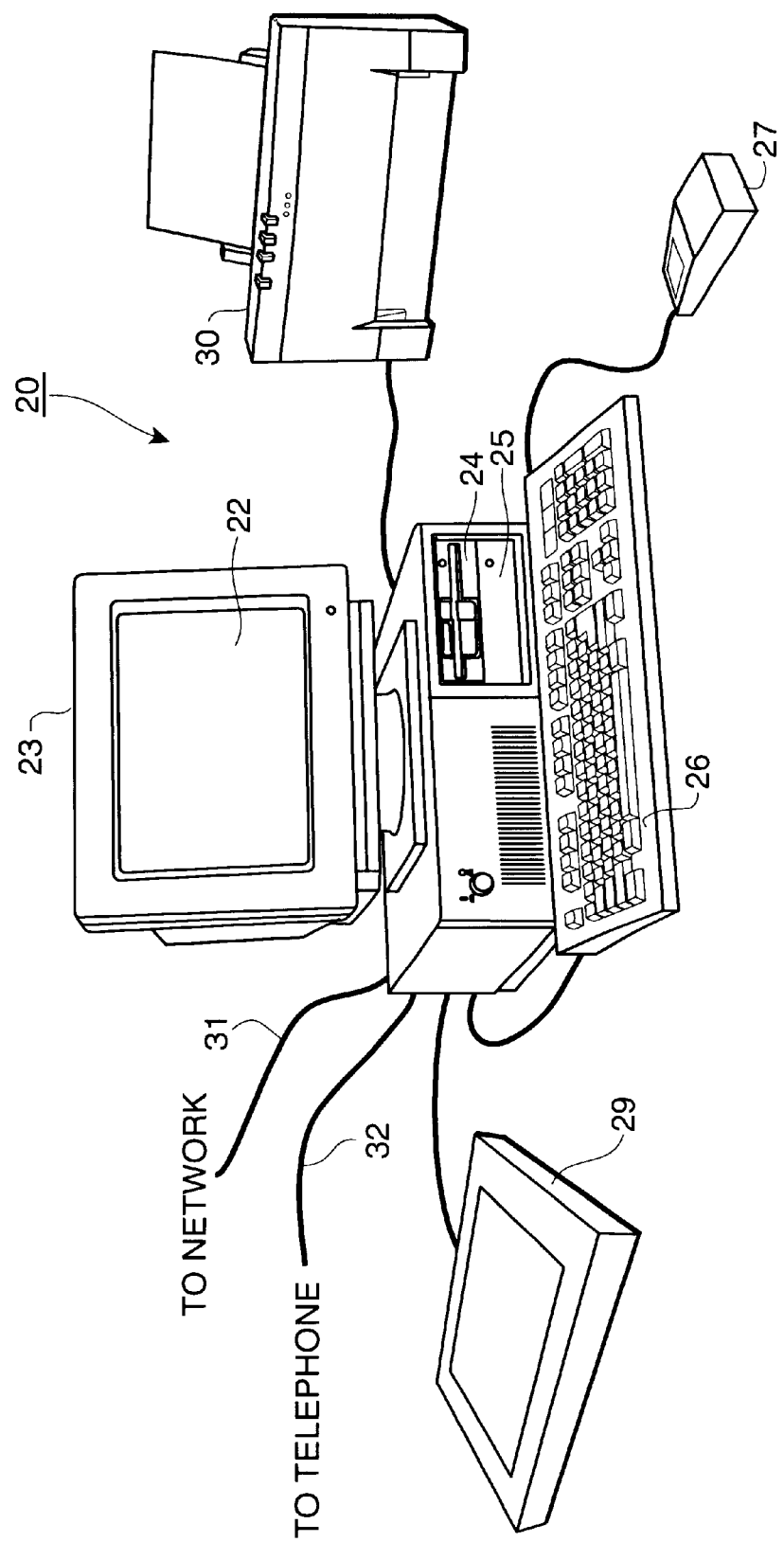
FIG. 1 is a view showing the outward appearance of the representative computing equipment which incorporates determination of the skew angle of a bitmap image as well as auto-cropping a bitmap image which has both background and image pixels, according to the present invention.

FIG. 1 shows one preferred embodiment of the invention implemented in a general purpose programmable computer. Shown in FIG. 1, is computing equipment 20 such as an IBM PC or PC-compatible computer having a windowing operating system such as Microsoft Windows operating system. Computing equipment 20 is provided with a display monitor 23 with a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects and images displayed on screen 22, and a pointing device 27 such as a mouse or the like which is also provided to permit manipulation of objects and images on display screen 22. A conventional scanner 29 is provided for scanning original documents such as color image documents and may be viewed on the display screen 22. A conventional color printer 30, such as a color bubble jet printer is provided for outputting color images. Also provided are connections 31 to a network or the internet, and connection 32 to an ordinary voice telephone line, both for sending and receiving color image data as well as other files which include program instruction sequences by which computing equipment 20 is operated.

In accordance with operator instructions, and under the control of the windowing operating system, stored application programs, such as graphics application programs and image manipulation application programs and the like, are selectively activated to input image data and thereby manipulate data and image data. Also in accordance with operator instructions, and based on stored application programs, commands are issued to obtain image files such as by scanning in images on scanner 29, to determine skew angle and de-skew the image file, and to auto-crop the image file as described more fully herein below.

Figure 2:
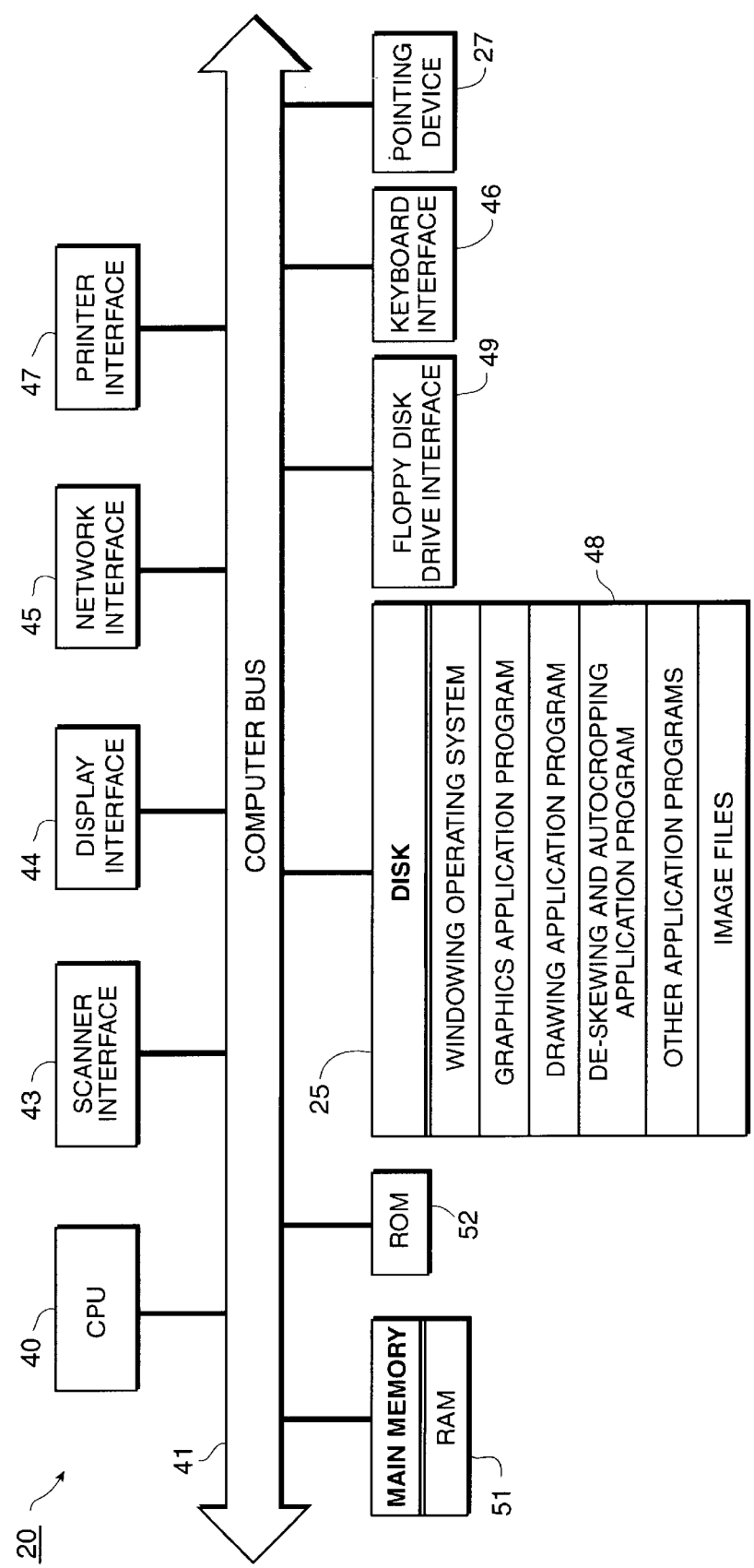
FIG. 2 is a detailed block diagram showing the internal construction of FIG. 1.

FIG. 2 is a detailed block diagram showing the internal construction of computing equipment 20. As shown in FIG. 2, computing equipment 20 includes a central processing unit (CPU) 40, which may be an Intel Pentium microprocessor interfaced with computer bus 41. Also interfaced with the computer bus 41 is a scanner interface 43, display interface 44, network interface 45, printer interface 47, pointing device interface 24, keyboard interface 46 and floppy disk drive interface 49.

Main memory 51 such as random access memory (RAM) interfaces with computer bus 41 so as to provide random access memory storage for use by CPU 20 when executing stored programs. In particular, when executing stored application program instruction sequences such as those associated with the application programs stored on disk 25, CPU 40 loads those instructions sequences from disk 25 or other storage media such as via the network 31 or floppy disk drive 24, into main memory 51 and executes those stored program instructions out of main memory 51.

ROM (read only memory) 52 is provided for storing invariant instruction sequences such as start-up instruction sequences or basic input/output operating system (BIOS) sequences for operation of keyboard 26.

As shown in FIG. 2 and previously mentioned, fixed disk 25 stores instruction sequences for the windowing operating system and for various application programs such as graphics application program and scanning application program, and the like. In addition, stored on fixed disk 25 are application programs 48 which deskew and autocrop bitmap images according to the invention.

Ordinarily, application programs stored on disk 25 need first to be installed by the user onto disk 25 from other computer readable media which contains the copy of the application program for deskewing and autocropping bitmap images according to the present invention. The user will install the application program by buying a floppy disk containing the application program, inserting the floppy into floppy disk drive 24 and by commanding CPU 20 to copy floppy disk drive onto fixed disk 25. The user may also download the program via telephone and modem interface 32 or via network 31 from a computerized bulletin board to which the deskewing and auto-cropping program had been previously uploaded.

Figure 3A:
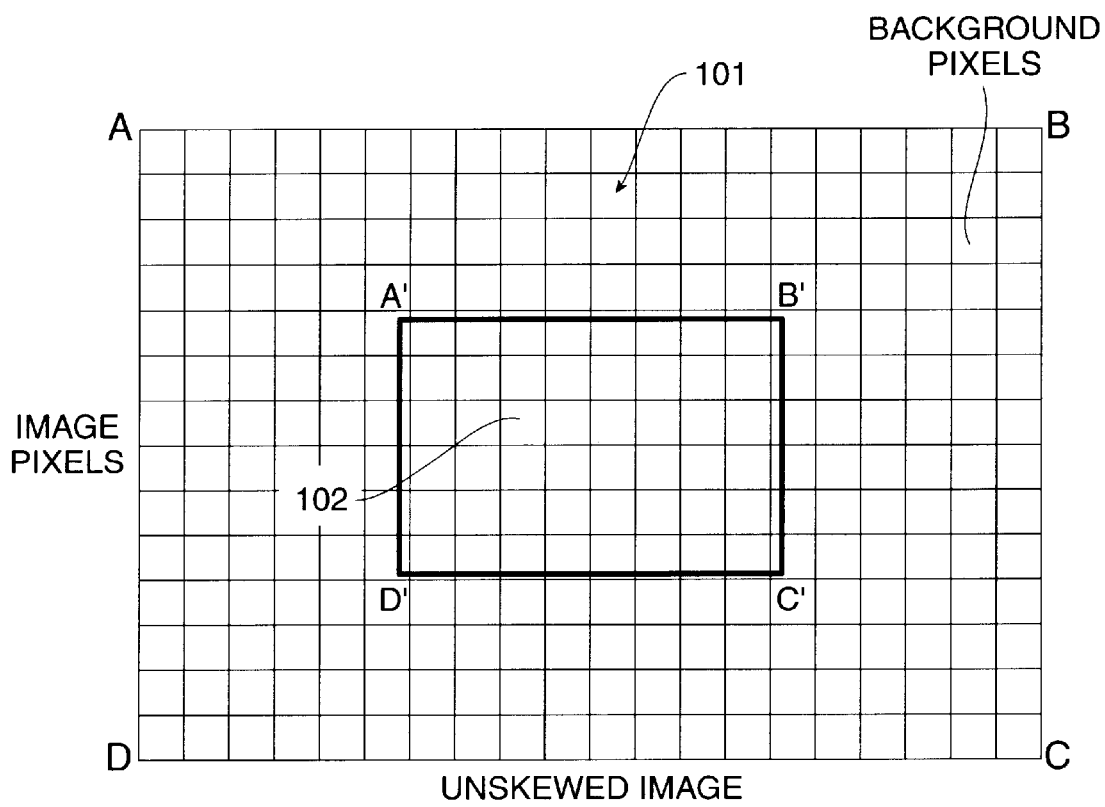
FIG. 3a is a representation of bitmap images which shows background and image pixels in a rectangular grid.

FIG. 3a, is a representational view of a bitmap image, forming a color image. Generally digital or bitmap images are comprised of pixels which are discrete units having digital image data and every pixel has a unique location and occupies a single set of co-ordinates on a rectangular grid or map. FIG. 3a shows an un-skewed bitmap image where the pixels are located on a rectangular grid 101, defined by ABCD. Pixels representing original bitmap image data 102 are shown in the rectangle A'B'C'D', and background pixels 104, are shown in the area between ABCD and A'B'C'D'. In an un-skewed bitmap image 102, the image pixels are located in the rectangle A'B'C'D' where all the four sides of the rectangle A'B'C'D' are parallel to the rectangular grid 101, defined by ABCD, as shown in FIG. 3a. In a skewed bitmap image 103, as shown in FIG. 3b, the image pixels defined by digital image data are skewed and the sides of the rectangle A'B'C'D' are no longer parallel to the rectangular grid ABCD and as described hereinbelow, the present invention, determines the skew angle, de-skews the image, and furthermore auto-crop's the actual image area defined by A'B'C'D' from the background area between ABCD and A'B'C'D'.

Determining the Skew Angle and Deskewing the Bitmap Image

Figure 3B:
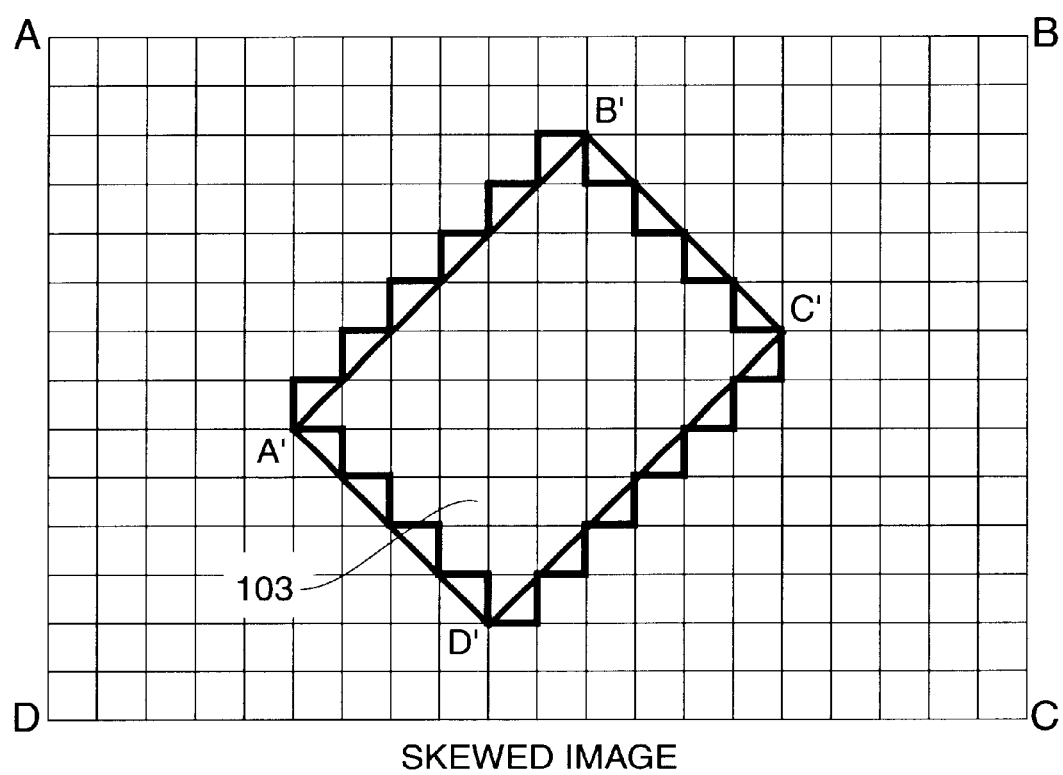
FIG. 3b is a representation of a skewed bitmap image.
Figure 4:
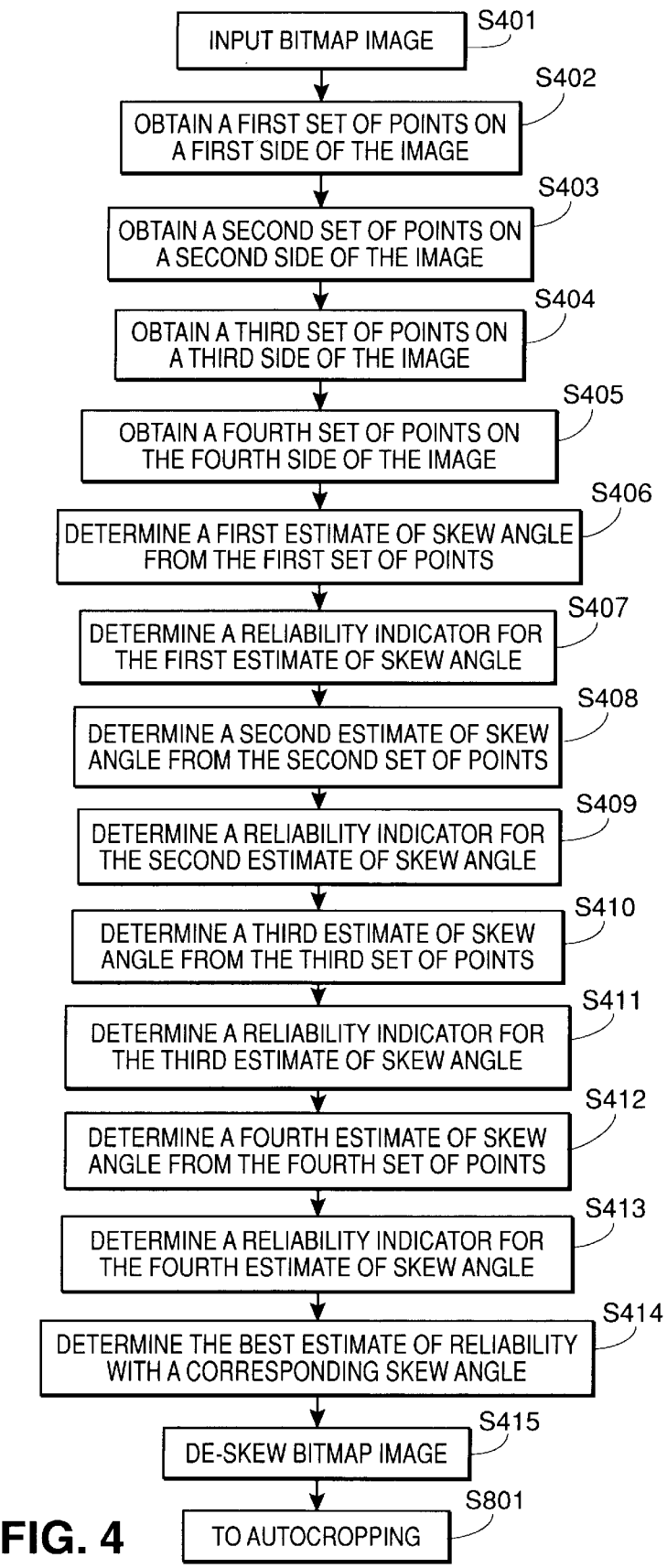
FIG. 4 is a flow diagram showing process steps for determining skew angle of a bitmap image according to one aspect of the invention.

FIG. 4 is a flow diagram showing the process steps for determining the skew angle of a bitmap image as shown in FIG. 3b, and thereafter deskewing the bitmap image by the determined skew angle. The process steps depicted in FIG. 4 are stored as computer code on disk 25, or in main memory 51, and executed by CPU. Generally speaking, the process depicted in FIG. 4, determines the skew angle of a skewed bitmap image comprising of background and image pixels by calculating plural estimates of the skew angle with corresponding reliability or confidence indicators and thereafter selecting the estimate skew angle with the best reliability or confidence indicator as the bitmap image skew angle. The bitmap image is then de-skewed by the determined skew angle.

In more detail, step S401 obtains a skewed bitmap image as shown in FIG. 3b, with background and image pixels from a scanner 29, disk 25 or over the network. Steps S402 through S405 identify for each side of the image, plural points along the side, resulting in plural set of plural points. The points are identified along plural lines parallel to the rectangular grid closest to each respective side of the image as described below.

Figure 5A:
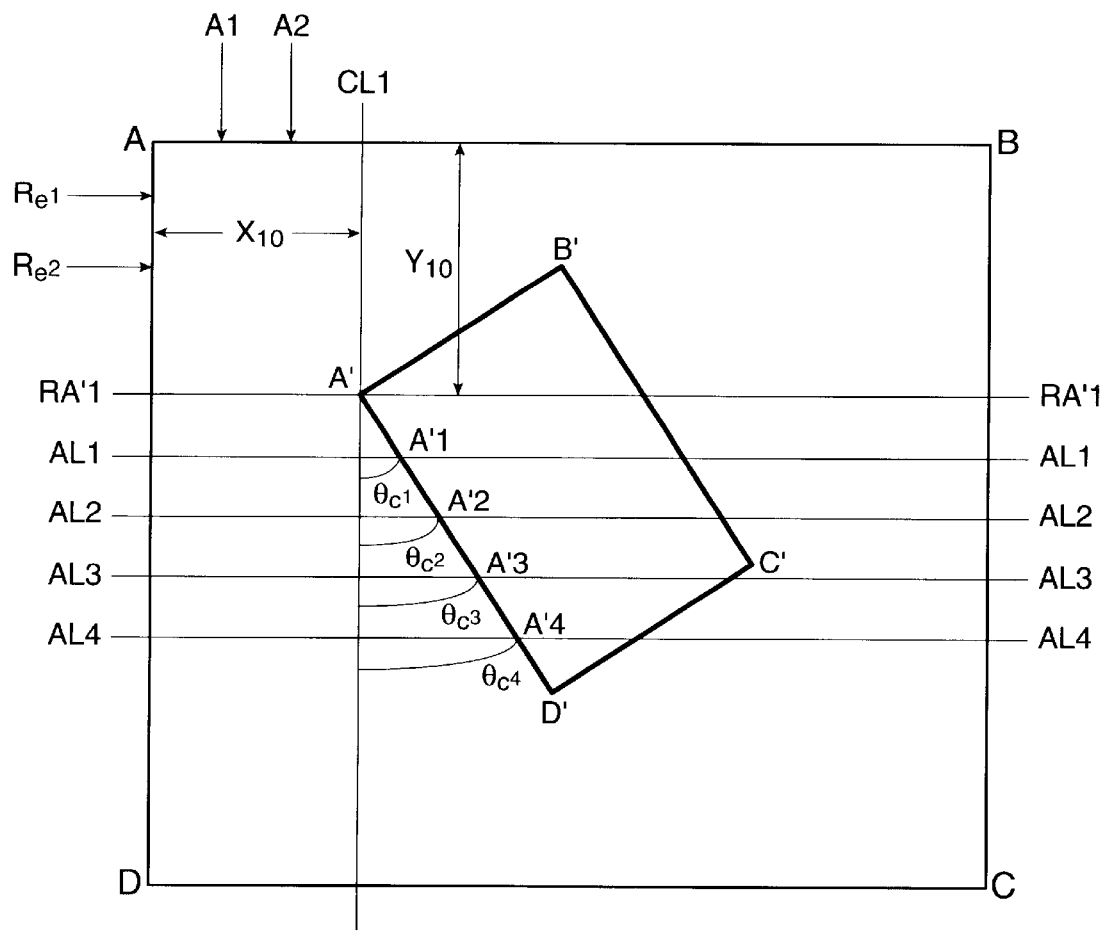
FIGS. 5a through 5d illustrate executing the process steps of FIG. 4.

In more detail, in step S402 a first set of points are obtained for side A'D', by a set of parallel lines which traverse in the first direction defined by AD in FIG. 5a. The parallel lines traverse from the background pixels located between the area ABCD and A'B'C'D', towards the image pixels within the area defined by A'B'C'D'. In the preferred embodiment the background pixels are white and the image pixels are not all white. A white pixel is defined as following:

Equation 1: $R+G+B>T1$ (1)

Equation 2: $|R-G|+|G-B|+|B-R|<T2$ (2)

Where R, G and B are the red, green and blue components of a pixel with values ranging from 0 to 255. In the preferred embodiment, T1 and T2 are variable threshold values, for example T1 may be 600 and T2 may be 50, for defining white pixels.

As shown in FIG. 5a, a first column CL1 which is not all white is determined by parallel lines by analyzing pixels along the parallel lines A1–An, according to equations 1 and 2. Thereafter, a first row RA'1 in column CL1 is determined which is not all white. FIG. 5a shows Rows Rl1 to Rln, where pixels along column CL1 are analyzed to determine if they are white or non-white and the first row on column CL1 which is non-white is determined and shown as RA'1. The first row RA'1 and first column CL1, define the first point A' with co-ordinates Xl0, Yl0, where Xl0 is the horizontal distance of point A' from the left side of the rectangular grid defined by side AD and Yl0 is the vertical distance from the top side defined by side AB of the rectangular grid. Thereafter, the image area is divided into N sections below point A' if A' lies in the top half of the image, or above point A' if A' lies in the bottom half of the image, for determining plural points along side A'D'. In the preferred embodiment as shown in FIG. 5a, N=4 and hence the image area is divided into 4 sections by parallel lines AL1, AL2, Al3 and AL4 and hence points A'1, A'2, A'3 and A'4 are located with co-ordinates (Xl1,Yl1), (Xl2,Yl2), (Xl3,Yl3) and (Xl4,Yl4). FIG. 5a shows the first set of plural points closest to the first side and along the first side A'D' as A', A'1, A'2, A'3 and A'4.

Figure 5B:
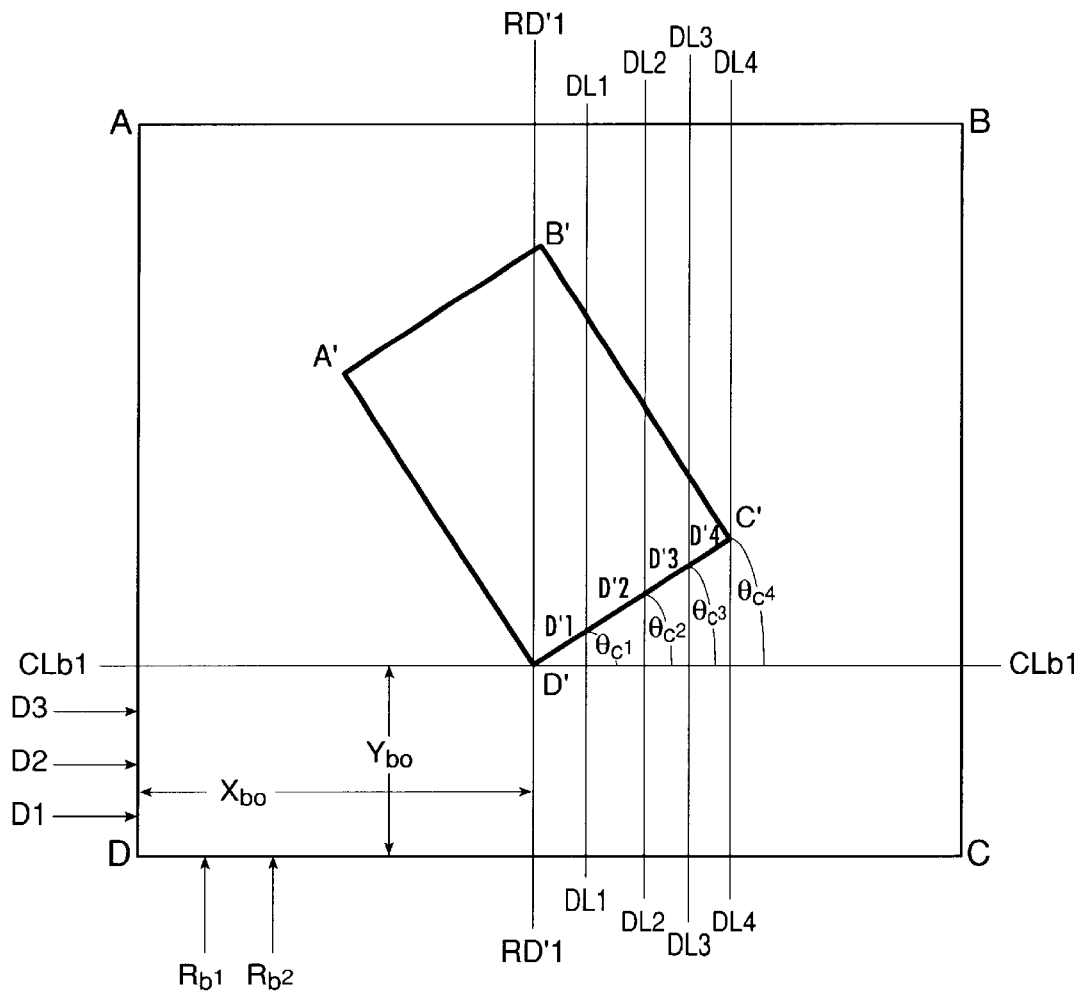

Step S403 obtains a second set of points for side D'C', by a set of parallel lines which traverse in the second direction defined by DC in FIG. 5b. The parallel lines traverse from the background pixels located between the area ABCD and A'B'C'D', toward the image pixels within the area defined by A'B'C'D'. In the preferred embodiment the background pixels are white and the image pixels are not all white.

As shown in FIG. 5b, a first column CLb1 which is not all white is determined by analyzing pixels along parallel lines D1–Dn, according to equations 1 and 2. Thereafter, a first row in column CLb1 is determined which is not all white. FIG. 5b shows Rows Rb1 to Rbn, where pixels along column CLb1 are analyzed to determine if they are white or non-white and the first row on column CLb1 which is non-white is determined and shown as RD'1. The first row RD'1 and first column CLb1, define the first point of the second set of plural points as D' with co-ordinates Xb0, Yb0, where Xb0 is the horizontal distance of point D' from side AD and Yb0 is the vertical distance from side DC. Thereafter, the image area is divided into N sections away from side AD and towards side BC if D' is closer to side AD than to side BC of the rectangular grid, or away from side BC and towards side AD if D' is closer to side BC than to side AD, for determining plural points along side A'D'. In the preferred embodiment as shown in FIG. 5b, N=4 and hence the image area is divided into 4 sections by parallel lines DL1, DL2, DL3 and DL4 and points D'1, D'2, D'3 and D'4 are located with co-ordinates (Xb1,Yb1), (Xb2,Yb2), (Xb3, Yb3) and (Xb4,Yb4). FIG. 5b shows the second set of plural points closest to the second side and along the second side D'C' as D', D'1, D'2, D'3 and D'4.

Figure 5C:
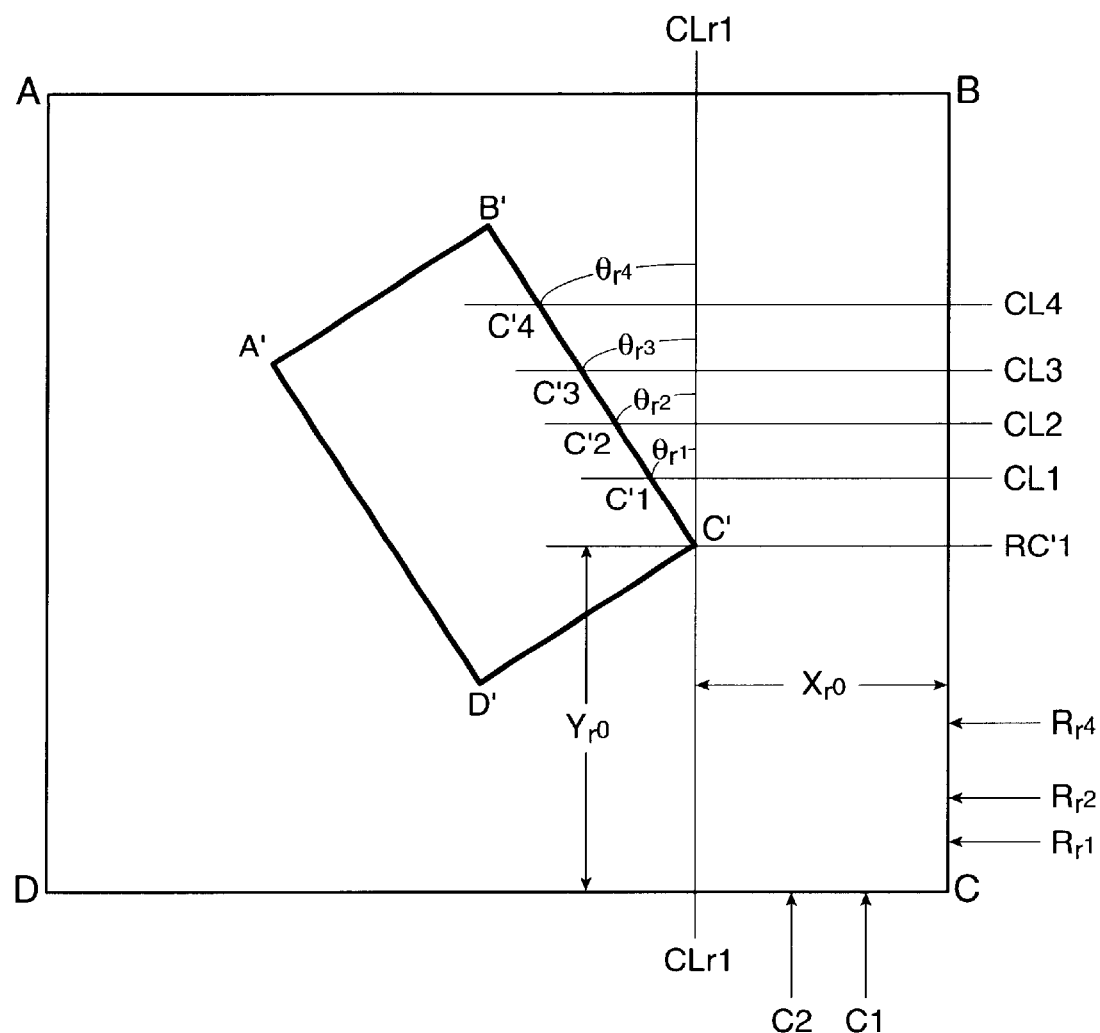
Figure 5D:
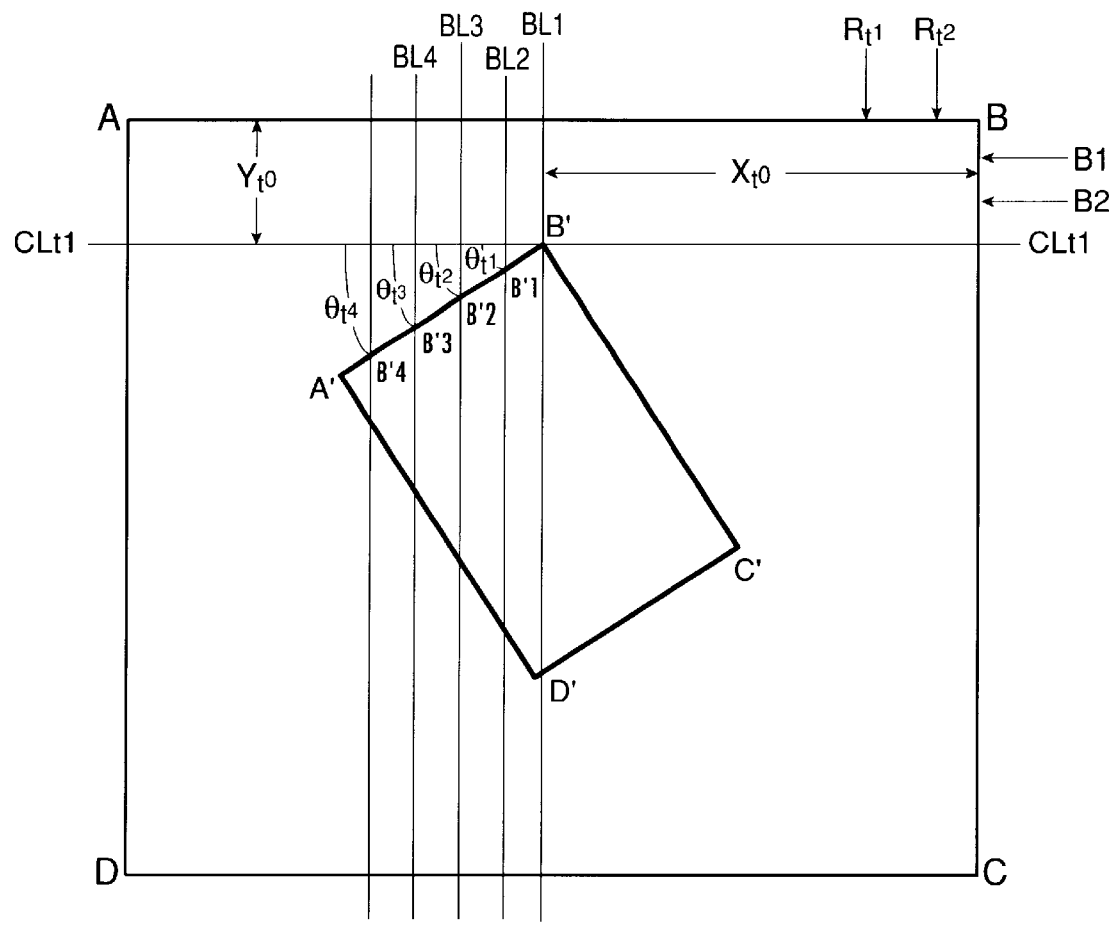

Similar to steps S402 and S403, steps S404 and S405 determine the third and fourth set of plural points for the third side C'B' and the fourth side B'A'. FIG. 5c shows the third set of points as C' (Xr0,Yr0), C'1 (Xr1,Yr1), C'2 (Xr2,Yr2), C'3 (Xr3,Yr3) and C'4 (Xr4,Yr4) and FIG. 5d shows the fourth set of points as B'(Xt0,Yt0), B'1 (Xt1,Yt1), B'2 (Xt2,Yt2), B'3 (Xt3,Yt3) and B'4 (Xt4,Y Steps S406 through S413 determine an estimate of skew angle, and a corresponding reliability indicator for the estimate, for each of the sets of points obtained in steps S402 to S405. In more detail, step S406, determines the first set of plural angles based upon the first set of points and the first estimate of the skew angle based upon the first set of plural angles. FIG. 5a, shows the first set points A', A'1, A'2, A'3 and A'4, which may be used to calculate the first set of plural angles, which depend upon the position of the first set of points with respect to the rectangular grid of the bitmap image defined by ABCD. For example, points A' and A'1 with co-ordinates (Xlo,Ylo) and (Xl1,Yl1) may be used to calculate the first angle of the first set of plural angles, where the first angle depends upon the coordinates of point A' and A'1, with respect to the grid defined by ABCD. The first angle, denoted as θl1 may be calculated by:

Arc ((Tan Xl1-Xo)/(Yl1-Yo)).

Similarly other angles of the first set of plural angles, denoted as θl2 to θln may be calculated by using the coordinates of A'l2 to A'ln, by:

Arc Tan ((Xli-X0)/(Yli-Yl0)), where i=1, 2, 3 - - - N.

Finally, the first estimate of the skew angle is determined from the mean angle of the first set of plural angles, θl1, θl2, θl3 and θl4 denoted as θl, where θl=1/NΣθli i=1 to N.

Step S407 determines a reliability indicator for the first estimate of the skew angle. In the preferred embodiment the standard deviation of angles θl1, θl2, θl3 and θl4 denoted as σl is the reliability indicator for the first estimate of the skew angle, and is determined by:

$$\sigma l = \sqrt{\left(\sum_i (\theta l - \theta l i)^{\wedge}2 / (N-1)\right)}$$

where i=1 to N

Step S408, determines the second set of plural angles based upon the second set of points and a second estimate of the skew angle. FIG. 5b, shows the second set points D', D'1, D'2, D'3 and D'4, which may be used to calculate the second set of plural angles which depend upon the position of the second set of points with respect to the rectangular grid defined by ABCD. For example, points D' and D'1 may be used to calculate the first angle of the second set of plural angles, where the first angle depends upon the coordinates of point D' (Xb0,Yb0) and D'1 (Xb1,Yb1), with respect to the grid defined by ABCD. The first angle of the second set of plural angles, denoted as θb1 may be calculated by:

ArcTan ((Yb1-Xbo)/(Xb1-Xbo)).

Similarly other angles of the second set of plural angles, denoted as θb2 . . . θbn, may be calculated by using the coordinates of D'2–D'n, by:

Arc Tan ((Ybi-Yb0)/(Xbi-Xb0)), where i=1,2, - - - N.

Finally, the second estimate of the skew angle is determined from the mean angle of the second set of plural angles, θb1, θb2, θb3 and θb4 denoted as θb, where θb=1/NΣθbi i=1 to N.

Step S409 determines a reliability indicator for the second estimate of the skew angle. In the preferred embodiment the standard deviation of angles θb1, θb2, θb3 and θb4 denoted as σb is the reliability indicator for the second estimate of the skew angle, and is determined by:

$$\sigma b = \sqrt{\sum_i (\theta_b - \theta_{bi})^{\wedge}2 / (N-1)}$$

where i=1 to N

Similar to steps S406 and S407, steps S410 and S411, determine the third set of plural angles based upon the third set of points and the third estimate of the skew angle with a reliability indicator. FIG. 5c shows the third set points C', C'1, C'2, C'3 and C'4, which may be used to calculate the third set of plural angles. The first angle of the third set of plural angles, denoted as θr1 may be calculated by:

Arc Tan ((Xr1-Xro)/(Yr1-Yro)).

Similarly other angles of the third set of plural angles, denoted as θr2 . . . θrn, may be calculated by using the coordinates of C'2–C'n, by:

Arc Tan ((Xri-Xr0)/(Yri-Yr0)), where i=1,2, - - - N.

The third estimate of the skew angle is determined from the mean angle of the third set of plural angles, θr1, θr2, θr3 and θr4 denoted as θr, where $$\theta r = 1/N \Sigma \theta ri \quad i=1 \text{ to } N.$$

Step S411 determines a reliability indicator for the third estimate of the skew angle. In the preferred embodiment the standard deviation of angles θr1, θr2, θr3 and θr4 denoted as σr is the reliability indicator for the third estimate of the skew angle, and is determined by:

$$\sigma r = \sqrt{\left(\sum_i (\theta_r - \theta_r i)^2\right) / (N-1)}$$

where i=1 to N

Similarly, steps S412 and S413 determine the fourth set of plural angles based upon the fourth set of points and the fourth estimate of the skew angle with a reliability indicator. FIG. 5d shows the fourth set points B', B'1, B'2, B'3 and B'4, which may be used to calculate the fourth set of plural angles.

The first angle of the fourth set of plural angles denoted as θt1 may be calculated by:

Arc Tan ((Yt1-Yto)/(Xt1-Xto)).

Similarly other angles of the fourth set of plural angles, denoted as θt2 . . . θtn, may be calculated by using the coordinates of B'2, to B'n, by:

Arc Tan ((Yti-Xt0)/(Yti-Xt0)), where i=1,2, - - - N.

The fourth estimate of the skew angle is determined from the mean angle of the fourth set of plural angles, θt1, θt2, θt3 and θt4 denoted as θt, where $$\theta t = 1/N \Sigma \theta ti \quad i=1 \text{ to } N.$$

Step S413 determines a reliability indicator for the fourth estimate of the skew angle. In the preferred embodiment the standard deviation of angles θt1, θt2, θt3 and θt4 denoted as σt is the reliability indicator for the fourth estimate of the skew angle, and is determined by:

$$\sigma t = \sqrt{\left(\sum_i (\theta_t - \theta_t i)^2\right) / (N-1)}$$

where i=1 to N

Step S414, determines which reliability indicator from among the reliability indicator for the first, second, third and fourth estimate of the skew angle is best. In the preferred embodiment, the best estimate of reliability is the smallest value of the standard deviation from among σr, σt, σb and σl. For example if σl, has the smallest value among σr, σl, σt, and σb, then σl is chosen as the best estimate of reliability. The skew angle is thereafter determined based upon which skew angle has the best reliability indicator. For example if σl has the smallest value, then the corresponding skew angle θl is chosen as the bitmap image skew angle.

Step S415 rotates the bitmap image by the skew angle determined in step S414. The preferred embodiment uses a matrix multiplication method with gradient detection, to de-skew the bitmap image. The center of the image is defined as the origin of a Cartesian co-ordinate system (using x and y-axis). The co-ordinates of any pixel in the image are defined with respect to the center. A pixel is chosen at random and a 2×2 matrix:

$$\begin{pmatrix} \cos\theta & \sin\theta \\ -\sin\theta & \cos\theta \end{pmatrix}$$

(where θ is the determined skew angle) is applied to the co-ordinates of the selected pixel. The result provides a floating point that must be interpolated, hence gradient is detected in the x and y direction and the floating point is interpolated in the direction of the minimum gradient. The matrix multiplication is applied to all the pixels and the image is de-skewed by the determined skew angle. The invention is not limited to matrix multiplication method of rotation, any other rotation method may be used to de-skew the image.

If the skew angle is negative, then the image is rotated in the counter clockwise direction and if the skew angle is positive, then the image is rotated in the clockwise direction. For example, if θ1 is chosen as the skew angle and is positive, then the image is rotated in the clockwise direction by θ1. If the skew angle was negative, then the image would have been rotated in the counter clockwise direction.

The invention is not limited to the foregoing convention of rotation, as the bitmap image may be rotated in the clockwise direction if the skew angle is negative or in the counter clockwise direction if the skew angle is a positive integer.

The present invention is not limited to the use of white pixels as background pixels, as defined by equations 1 and 2. Other colors may be used to differentiate between background and image pixels. Furthermore, the threshold hold values for T1 and T2 in equation 1 and 2 may be varied and hence may be different from T1=600 and T2=50

The present invention is also not limited to any particular order shown in FIG. 4. For example, the second set of angles may be calculated before the first set. Furthermore, the coordinates of the first, second, third and fourth set of points may be determined with respect to any side of the bitmap image or to any other orthogonal axis. The details shown in FIGS. 5a through 5d, are illustrative and not exhaustive to practice the present invention.

Furthermore, other estimates including statistical indices, besides the standard deviation may be used as estimate of reliability for the estimates of the skew angle. Also, the plural sets of angles may be calculated by other trigonometric method for example the inverse cosine of the angles may be used to calculate the plural set of angles.

The invention is also not limited to using the mean angle with the best reliability as the bitmap image skew angle. The minimum angle from the set of plural angles with the best reliability may be used as the bitmap skew angle. For example, if the first set of plural angles (θ11, θ12, θ13 and θ14) has the smallest standard deviation from among plural set of angles and θ14 is the smallest angle from among, θ11, θ12, θ13 and θ14, then θ14 may be chosen as the bitmap skew angle.

The present invention is not limited to dividing the image areas into equal sections as shown in steps S402, S403, S405 and S406. The number of regions the image is divided into may be varied for each side. For example, for the first side A'D', in step S402, the image area may be sub-divided into 3 section, where N=2 and the second side D'C' may be sub-divided into 2 regions where N=3. Furthermore, the image area may be divided into unequal sections, for example when the first side is divided into 4 sections, not every section may be equal to each other.

Figure 6:
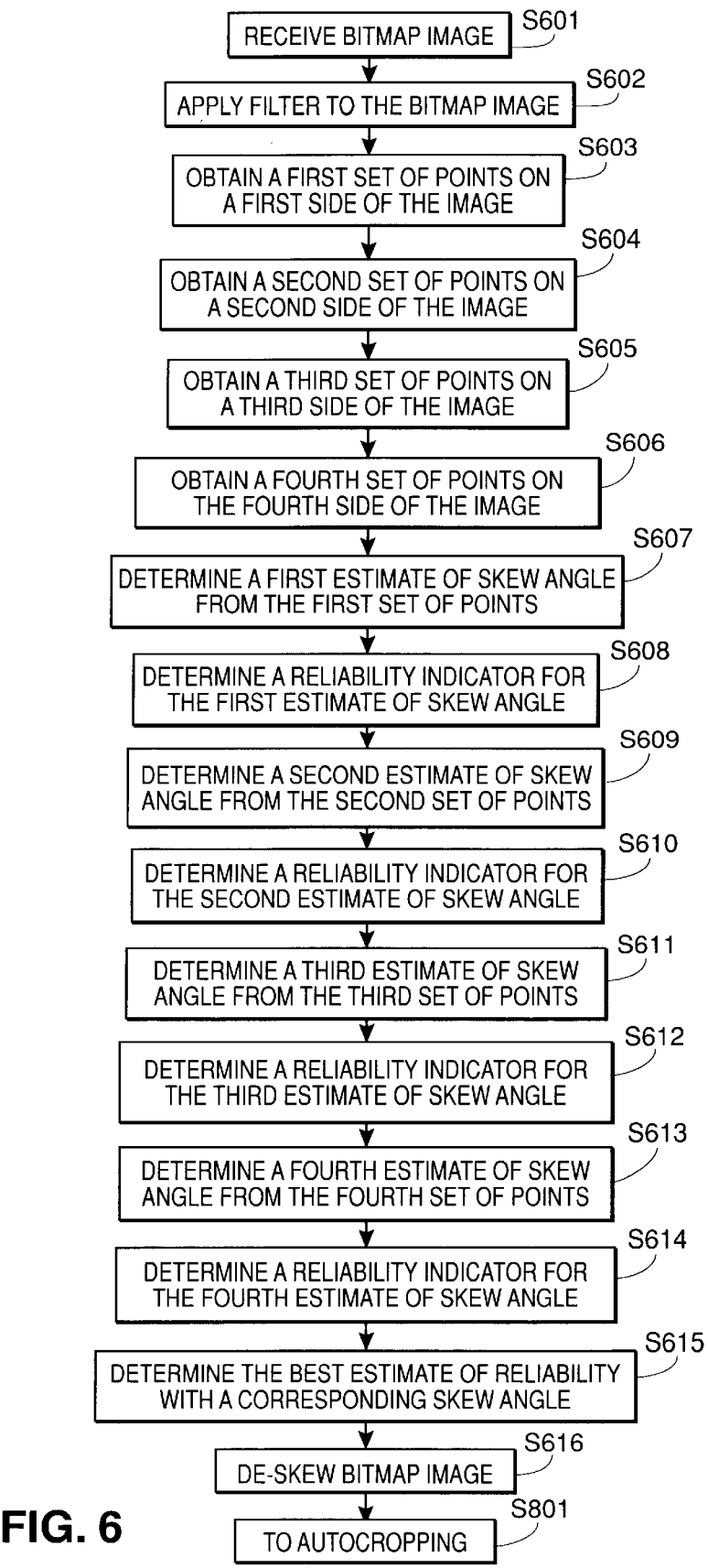
FIG. 6 is a flow diagram showing process steps for pre-processing the bitmap image by applying a filter and then determining skew angle of a bitmap image.
Figure 7:
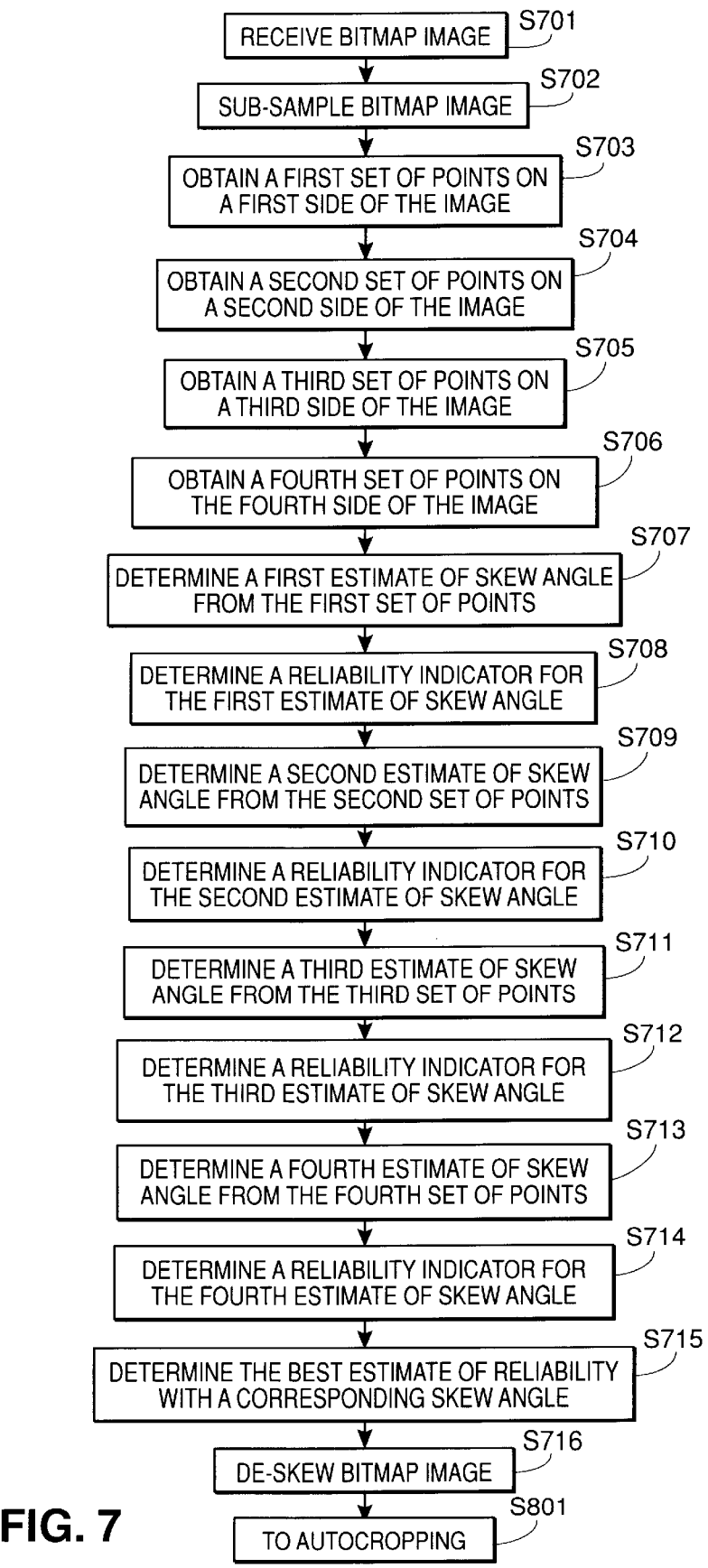
FIG. 7 is a flow diagram showing process steps for pre-processing the bitmap image by sub-sampling the bitmap image and then determining skew angle of a bitmap image.

Pre-processing the Bitmap Image:

The bitmap image received in step S401 may be pre-processed prior to determining the bitmap image skew angle and de-skewing the image. FIGS. 6 and 7 shows the process steps for preprocessing the bitmap image including filtering which allows a user to adjust the values of a pixel or a group of pixels based upon a mathematical relationship, and sub-sampling the image for reducing the input image resolution and thereby speeding performance. The process steps shown in FIGS. 6 and 7 are stored as computer code on disk 25, or in main memory 51, and executed by CPU 20.

Figure 8:
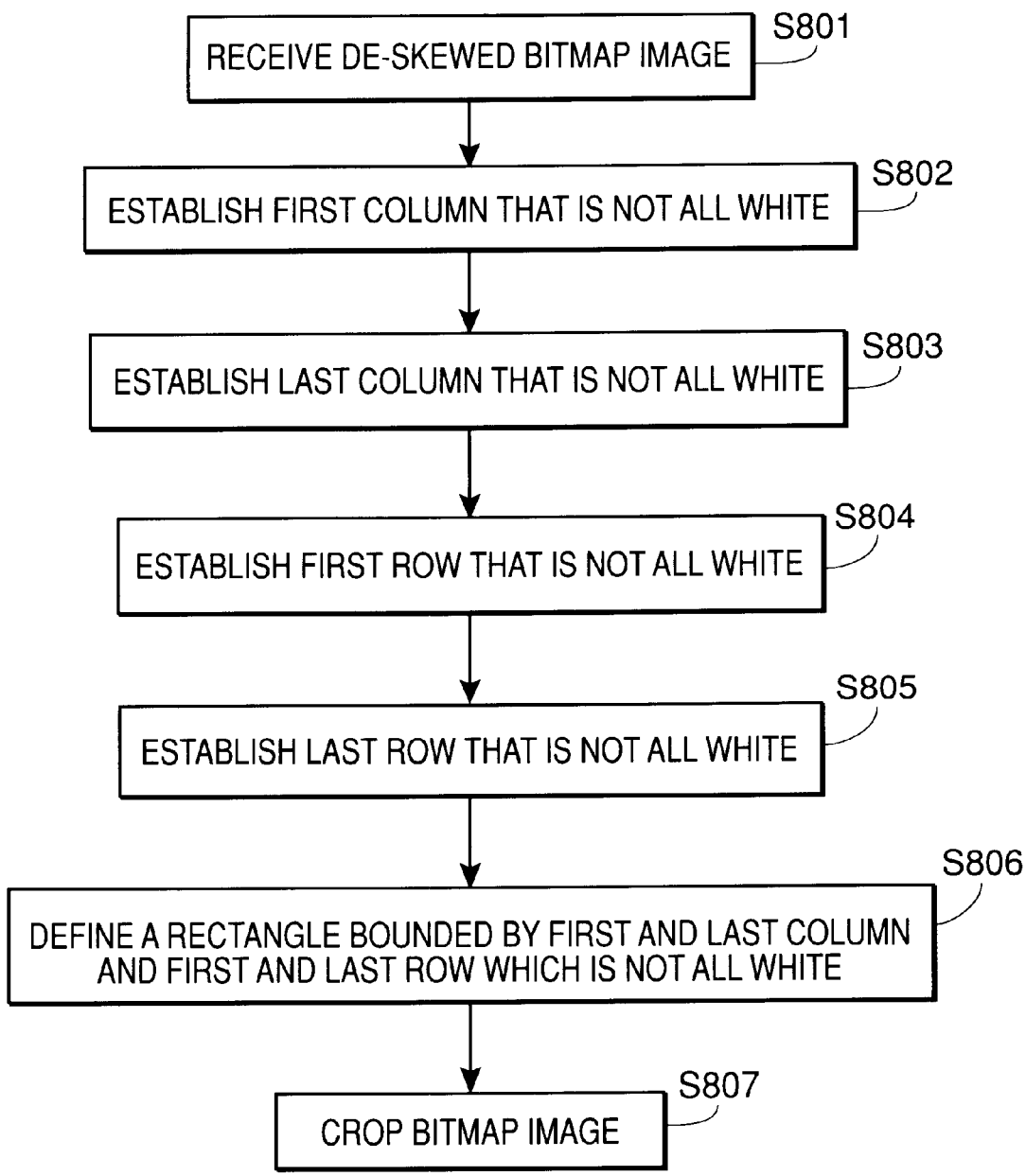
FIG. 8 is a flow diagram showing process steps for auto-cropping a bitmap image with image and background pixels.

Filtering:

Generally speaking, filtering of the original image may be desirable if there are noise artifacts which the user may want to eliminate prior to de-skewing or auto-cropping as shown in the process steps of FIGS. 4 and 8. Steps S601 to S616 filters the original scanned image, determines the bitmap skew angle and de-skews the bitmap image. In more detail, step S601, receives a bitmap image from a scanner 29, or network connection with noise artifacts. Step S602 applies a filter to the bitmap image for removing some of the artifacts from the received image. Various filters may be applied to the received bitmap image. In the preferred embodiment a median filter is applied for a target pixel which arranges the pixel values in a defined window around the target pixel in an increasing or decreasing order. The median value is selected for the target pixel. The median filter removes isolated lines or pixels while maintaining spatial resolution. It is noteworthy that other filters for example spatial low pass, high pass and band pass filters may be applied to the received image for filtering the image.

Steps S603 to S616 are identical to steps S402 to S415 which determine the bitmap image skew angle and de-skew the image by the determined skew angle of the filtered image.

Subsampling;

Generally speaking, a user may scan the original image at a high resolution such as 300 dpi in step S401. The present invention does not require a high resolution for determining the bitmap skew angle, de-skewing and auto-cropping the image. The high resolution of the scanned image however may slow the computing process that determines the bitmap image skew angle, de-skews and auto-crops the bitmap image. Therefore it is desirable to reduce the resolution of the scanned image by sub-sampling the original scanned image. Steps S701 to S716 sub-sample the input image, determine the skew angle of the sub-sampled bitmap image, and de-skew the original bitmap bitmap image.

In more detail, step 701, receives the image from a scanner, at a user defined resolution. Step S702 sub-samples the scanned image, where every fifth pixel is chosen and reproduced and thereby reducing the resolution of the scanned image. Step S703 through step S716 determine the bitmap image skew angle and de-skew the bitmap image by the same process shown in FIG. 4, steps S402 to S414.

It is noteworthy that that the sub-sampling process may also be combined with the image filtering process shown in FIG. 6.

It is emphasized that several changes and modifications may be applied to the above-described embodiment, without departing from the teaching of the invention. It is intended that all matter contained in the present disclosure, or shown in the accompanying drawings, shall be illustrative rather than limiting. In particular, it is to be understood that any combination of the foregoing embodiment may be utilized, so that the specifics of the embodiment may be combined in different ways to achieve the same results.

Auto-cropping the De-skewed Bitmap Image

FIG. 8, shows process steps of one embodiment of the present invention, which auto-crops the bitmap image so that the resulting image only has image pixels. The process steps of FIG. 8 are stored as computer code on disk 25, or in main memory 51, and executed by CPU 20. Generally speaking, the process steps of FIG. 8 auto-crop a bitmap image comprising of background and image pixels. Initially, the first and last column and first and last row of pixels which are not white are determined and thereafter the image is auto-cropped around the rectangle defined by the first and last column and first and last row of pixels which are not all white.

Figure 9:
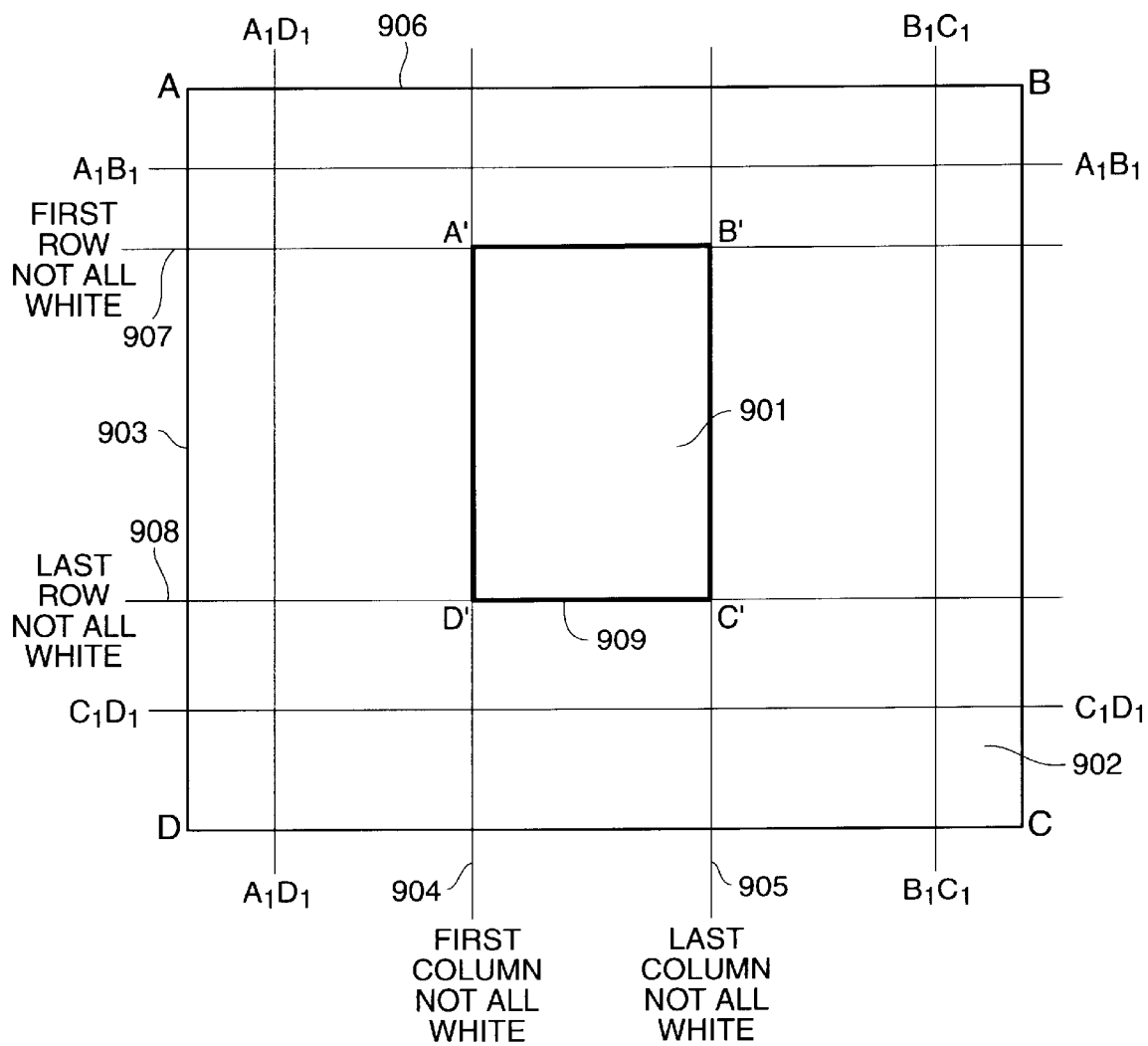
FIG. 9 illustrates executing the process steps of FIG. 8.

In more detail, Step S801 obtains a bitmap image. Preferably the bitmap image has been de-skewed such as by de-skewing according to FIGS. 4, 6 or 7. As shown in FIG. 9, the received image has both background, 901, and image pixels, 902. Steps S802 through S803 determine the first and last column of pixels which are not all white. In the preferred embodiment white pixels are defined by equations 1 and 2. In more detail, step S802 analyzes pixel starting from one corner of the image. As shown in FIG. 9, in step S802, pixels located along the columns starting from AD, 903, to A1D1, A2D2, are analyzed untill a column is reached where all the pixels are not white. FIG. 9, shows column A'D', 904, as the first column that is not all white.

Step S803 determines the last column that is not all white. As shown in FIG. 9, in step S803 pixels located along the columns starting from BC to B1C1, B2C2 - - - BnCn, are analyzed till a column is reached which is not all white. FIG. 9 shows B'C', 905 as the last column that is not all white.

Steps S804 and S805 determine the first and last row of pixels that is not all white. In more detail as shown in FIG. 9, in step S804 pixels located along the rows starting from AB, 906, to A1B1, A2B2 - - - AnBn, are analyzed till a row is reached which is not all white. FIG. 9 shows A'B', 907, as the first row that is not all white.

In step S805 pixels located along the rows starting from CD to C1D1, C2D2 - - - CnDn, are analyzed till a row is reached which is not all white. FIG. 9 shows C'D', 908, as the last row that is not all white.

Step S806, defines a rectangle comprised of the first and last column and the first and last row of pixels, which in the preferred embodiment are not all white. The rectangle A'B'C'D', 909, shown in FIG. 9, comprises of image pixels after the first and last column, and the first and last row of pixels which are not all white have been identified. Step S807, crops the image around the defined rectangle A'B'C'D', 909, as shown in FIG. 9.

The present invention is not limited to the sequence followed in the process flow shown in FIG. 8. Any corner of the image may be used as the starting point to determine the boundaries of the rectangle used to crop the bitmap image.

It is emphasized that several changes and modifications may be applied to the above-described embodiment, without departing from the teaching of the invention. It is intended that all matter contained in the present disclosure, or shown in the accompanying drawings, shall be illustrative rather than limiting.

What is claimed is:

1. A method for determining the skew angle of a bitmap image comprised of image pixels and background pixels, comprising the steps of:

calculating a first estimate of the skew angle for a first side of the bitmap image and a corresponding first reliability indicator, both the first estimate of the skew angle and the first reliability indicator being based on a first set of plural angles which are calculated at a plurality of positions along the first side, the first set of plural angles being based on the position of image pixels closest to the first side;

calculating a second estimate of the skew angle for a second side of the bitmap image and a corresponding second reliability indicator, both the second estimate of the skew angle and the second reliability indicator being based on a second set of plural angles which are calculated at a plurality of positions along the second side, the second set of plural angles being based on the position of image pixels closest to the second side; and determining the skew angle in accordance with which of the first and second estimates has the better reliability indicator.

2. A method according to claim 1, further comprising the steps of:

calculating a third estimate of the skew angle for a third side of the bitmap image and a corresponding third reliability indicator, both the third estimate of the skew angle and the third reliability indicator being based on a third set of plural angles which are calculated at a plurality of positions along the third side, the third set of plural angles being based on the position of image pixels closest to the third side; and calculating a fourth estimate of the skew angle for a fourth side of the bitmap image and a corresponding fourth reliability indicator, both the fourth estimate of the skew angle and the fourth reliability indicator being based on a fourth set of plural angles which are calculated at a plurality of positions along the fourth side, the fourth set of plural angles being based on the position of image pixels closest to the fourth side.

3. A method according to claim 2, further comprising the steps of:

calculating the first set of plural angles by inverse tangent, based upon the positions of image pixels closest to the first side at a plurality of positions along the first side;

calculating the second set of plural angles by inverse tangent, based upon the positions of image pixels closest to the second side at a plurality of positions along the second side;

calculating the third set of plural angles by inverse tangent, based upon the positions of image pixels closest to the third side at a plurality of positions along the third side; and calculating the fourth set of plural angles by inverse tangent, based upon the positions of image pixels closest to the fourth side at a plurality of positions along the fourth side.

4. A method according to claim 3, further comprising the steps of:

calculating a first mean of the first set of plural angles, wherein the first estimate of the skew angle is based upon the first mean;

calculating a first standard deviation of the first set of plural angles, wherein the first standard deviation is the reliability indicator for the first estimate of the skew angle;

calculating a second mean of the second set of plural angles, wherein the second estimate of the skew angle is based upon the second mean;

calculating a second standard deviation of the second set of plural angles, wherein the second standard deviation is the reliability indicator of the second estimate of the skew angle;

calculating a third mean of the third set of plural angles, wherein the third estimate of the skew angle is based upon the third mean;

calculating a third standard deviation of the third set of plural angles, wherein the third standard deviation is the reliability indicator of the third estimate of the skew angle;

calculating a fourth mean of the fourth set of plural angles, wherein the fourth estimate of the skew angle is based upon the fourth mean; and calculating a fourth standard deviation of the fourth set of plural angles, wherein the fourth standard deviation is the reliability indicator of the fourth estimate of the skew angle.

5. A method according to claim 4, wherein the best reliability indicator is the least standard deviation from among the first, second, third and fourth standard deviations, with a corresponding mean and a minimum angle.

6. A method according to claim 5, wherein the bitmap image skew angle is the mean angle corresponding to the least standard deviation, from among the first, second, third and fourth standard deviation.

7. A method according to claim 5, wherein the bitmap image skew angle is the minimum angle corresponding to the least standard deviation from among the first, second, third and fourth standard deviations.

8. A method according to claim 1, wherein the background pixels are white.

9. A method according to claim 1, wherein the image pixels are not all white.

10. A method according to claim 8, wherein the background pixels are non-white.

11. A method according to claim 10, wherein the image pixels are of a different color than the background pixels.

12. A method according to claim 1, further comprising the steps of:

pre-processing the bitmap image prior to determining the skew angle by applying a filter to the bitmap image.

13. A method according to claim 12, wherein said filter is a median filter.

14. A method according to claim 1, further comprising of:

sub-sampling said bit map image prior to calculating the bit map skew angle.

15. A method according to claim 1, further comprising of:

de-skewing the bitmap image by the bitmap image skew angle.

16. A method according to claim 15, further comprising of:

auto-cropping the de-skewed image.

17. A method according to claim 1, further comprising of:

obtaining a first set of points from the bitmap image, wherein the first set of points comprises of image pixels first encountered when a set of parallel lines are traversed in a first direction from background pixels to image pixels;

calculating a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

obtaining a second set of points from the bitmap image, wherein the second set of points comprises of image pixels first encountered when a second set of parallel lines are traversed in a second direction from background pixels to image pixels;

calculating a second estimate of the skew angle and a corresponding second estimate of reliability, wherein the second estimate of the skew angle is based upon a second mean of plural angles, derived from the coordinates of the second set of points and determined by inverse tangent, and the second estimate of reliability is based upon the standard deviation of the plural angles based upon the second set of points;

obtaining a third set of points from the bitmap image, wherein the third set of points comprises of image pixels first encountered when a third set of parallel lines are traversed in a third direction from background pixels to image pixels;

calculating a third estimate of the skew angle and a corresponding third estimate of reliability, wherein the third estimate of the skew angle is based upon a mean of plural angles derived from the coordinates of the third set of points and determined by inverse tangent, and the third estimate of reliability is based upon the standard deviation of the plural angles based upon the third set of points;

obtaining a fourth set of points from the bitmap image, wherein the fourth set of points comprises of image pixels first encountered when a fourth set of parallel lines are traversed in a fourth direction from background pixels to image pixels; and calculating a fourth estimate of the skew angle and a corresponding fourth estimate of reliability, wherein the fourth estimate of the skew angle is based upon a mean of plural angles derived from the coordinates of the fourth set of points and determined by inverse tangent, and the fourth estimate of reliability is based upon the standard deviation of the plural angles based upon the fourth set of points.

18. A method according to claim 1, further comprising the steps of:

calculating a first set of plural angles by inverse tangent, based upon the positions of image pixels closest to the first side at a plurality of positions along the first side; and calculating a second set of plural angles by inverse tangent, based upon the positions of image pixels closest to the first side at a plurality of positions along the first side; and calculating a second set of plural angles by inverse tangent, based upon the positions of image pixels closest to the second side at a plurality of positions along the second side.

19. A method according to claim 18, further comprising the steps of:

calculating a first mean of the first set of plural angles, wherein the first estimate of the skew angle is based upon the first mean;

calculating a first standard deviation of the first set of plural angles, wherein the first standard deviation is the reliability indicator for the first estimate of the skew angle;

calculating a second mean of the second set of plural angles, wherein the second estimate of the skew angle is based upon the second mean; and calculating a second standard deviation of the second set of plural angles, wherein the second standard deviation is the reliability indicator of the second estimate of the skew angle.

20. A method according to claim 19, wherein the best reliability indicator is the least standard deviation from among the first and second standard deviations, with a corresponding mean and a minimum angle.

21. A method according to claim 20, wherein the bitmap image skew angle is the mean angle corresponding to the least standard deviation, from among the first and second standard deviation.

22. A method according to claim 21, wherein the bitmap image skew angle is the minimum angle corresponding to the least standard deviation from among the first and second standard deviations.

23. A method according to claim 1, further comprising of:

obtaining a first set of points from the bitmap image, wherein the first set of points comprises of image pixels first encountered when a set of parallel lines are traversed in a first direction from background pixels to image pixels;

calculating a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

obtaining a second set of points from the bitmap image, wherein the second set of points comprises of image pixels first encountered when a second set of parallel lines are traversed in a second direction from background pixels to image pixels; and calculating a second estimate of the skew angle and a corresponding second estimate of reliability, wherein the second estimate of the skew angle is based upon a second mean of plural angles, derived from the coordinates of the second set of points and determined by inverse tangent, and the second estimate of reliability is based upon the standard deviation of the plural angles based upon the second set of points.

24. An apparatus for determining the skew angle of a bitmap image comprised of image pixels and background pixels, comprising of:

first calculating means for calculating a first estimate of the skew angle for a first side of the bitmap image and a corresponding first reliability indicator, both the first estimate of the skew angle and the first reliability indicator being based on a first set of plural angles which are calculated at a plurality of positions along the first side, the first set of plural angles being based on the position of image pixels closest to the first side;

second calculating means for calculating second estimate of the skew angle for a second side of the bitmap image and a corresponding second reliability indicator, both the second estimate of the skew angle and the second reliability indicator being based on a second set of plural angles which are calculated at a plurality of positions along the second side, the second set of plural angles being based on the position of image pixels closest to the second side; and determining means for determining the skew angle in accordance with which of the first and second estimates has the better confidence indicator.

25. An apparatus according to claim 24, further comprising:

third calculating means for calculating a third estimate of the skew angle for a third side of the bitmap image and a corresponding third reliability indicator, both the third estimate of the skew angle and the third reliability indicator being based on a third set of plural angles which are calculated at a plurality of positions along the third side, the third set of plural angles being based on the position of image pixels closest to the third side; and fourth calculating means for calculating a fourth estimate of the skew angle for a fourth side of the bitmap image and a corresponding fourth reliability indicator, both the fourth estimate of the skew angle and the fourth reliability indicator being based on a fourth set of plural angles which are calculated a plurality of positions along the fourth side, the fourth set of plural angles being based on the position of image pixels closest to the fourth side.

26. An apparatus according to claim 25, further comprising:

fifth calculating means for calculating the first set plural angles by inverse tangent, based upon the position of image pixels closest to the first side at a plurality of positions along the first side;

sixth calculating means for calculating the second set of plural angles by inverse tangent, based upon the position of image pixels closest to the second side at a plurality of positions along the second side;

seventh calculating means for calculating the third set of plural angles by inverse tangent, based upon the position of image pixels closest to the third side at a plurality of positions along the third side, by inverse tangent;

eighth calculating means for calculating the fourth set of plural angles by inverse tangent, based upon the position of image pixels closest to the fourth side at a plurality of positions along the fourth side.

27. An apparatus according to claim 26, further comprising:

ninth calculating means for calculating a first mean of the first set plural angles, wherein the first estimate of the skew angle is based upon said first mean;

tenth calculating means for calculating a first standard deviation of the first set of plural angles, wherein the first standard deviation is the reliability indicator of the first estimate of the skew angle;

eleventh calculating means for calculating a second mean of the second set of plural angles, wherein the second estimate of the skew angle is based upon said second mean;

twelfth calculating means for calculating a second standard deviation of the second set of plural angles, wherein the second standard deviation is the reliability indicator of the second estimate of the skew angle, thirteenth calculating means for calculating a third set plural angles, wherein the third estimate of the skew angle is based upon third said mean;

fourteenth calculating means for calculating a third standard deviation of the third set of plural angles, wherein the third standard deviation is the reliability indicator of the third estimate of the skew angle;

fifteenth calculating means for calculating a fourth set plural angles, wherein the fourth estimate of the skew angle is based upon fourth said mean; and sixteenth calculating means for calculating a fourth standard deviation of the third set of plural angles, wherein the fourth standard deviation is the reliability indicator of the fourth estimate of the skew angle.

28. An apparatus according to claim 27, wherein the best reliability indicator is the least standard deviation from among the first, second, third and fourth standard deviations, with a corresponding mean and minimum angle.

29. An apparatus according to claim 28, wherein the bitmap image skew angle is the mean angle corresponding to the least standard deviation, from among the first, second, third and fourth standard deviations.

30. An apparatus according to claim 28, wherein the bitmap image skew angle is the minimum angle corresponding to the least standard deviation from among the first, second, third and fourth standard deviations.

31. An apparatus according to claim 24, wherein the background pixels are white.

32. An apparatus according to claim 24, wherein the image pixels are not all white.

33. An apparatus according to claim 31, wherein the background pixels are of a different color than white.

34. An apparatus according to claim 33, wherein the image pixels are of a different color than the background pixels.

35. An apparatus according to claim 24, further comprising:

pre-processing means for pre-processing the bitmap image prior to determining the skew angle by applying a filter.

36. An apparatus according to claim 35, wherein said filter is a median filter.

37. An apparatus according to claim 24, further comprising of:

sub-sampling means for sub-sampling said bit map image prior to determining the bit map skew angle.

38. An apparatus according to claim 24, further comprising:

de-skewing means for de-skewing the bitmap image.

39. An apparatus according to claim 38, further comprising:

auto- cropping means for auto-cropping the de-skewed image.

40. An apparatus according to claim 27, further comprising of:

obtaining means for obtaining a first set of points from the bitmap image, wherein the first set of points comprises of image pixels first encountered when a set of parallel lines are traversed in a first direction form background pixels to image pixels;

seventeenth calculating means for calculating a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

obtaining means for obtaining a second set of points from the bitmap image, wherein the second set of points comprises of image pixels first encountered when a second set of parallel lines are traversed in a second direction from background pixels to image pixels;

eighteenth calculating means for calculating a second estimate of the skew angle and a corresponding second estimate of reliability, wherein the second estimate of the skew angle is based upon the second mean of plural angles, derived from the coordinates of the second set of points and determined by inverse tangent, and the second estimate of reliability is based upon the standard deviation of the plural angles based upon the second set of points;

obtaining means for obtaining a third set of points from the bitmap image, wherein the third set of points comprises of image pixels first encountered when a third set of parallel lines are traversed in a third direction from background pixels to image pixels;

nineteenth calculating means for calculating a third estimate of the skew angle and a corresponding third estimate of reliability, wherein the third estimate of the skew angle is based upon a mean of plural angles derived from the coordinates of the third set of points and determined by inverse tangent, and the third estimate of reliability is based upon the standard deviation of the plural angles based upon the third set of points;

obtaining means for obtaining a fourth set of points from the bitmap image, wherein the fourth set of points comprises of image pixels first encountered when a fourth set of parallel lines are traversed in a fourth direction from background pixels to image pixels; and twentieth calculating means for calculating a fourth estimate of the skew angle and a corresponding fourth estimate of reliability, wherein the fourth estimate of the skew angle is based upon a mean of plural angles derived from the coordinates of the fourth set of points and determined by inverse tangent, and the fourth estimate of reliability is based upon the standard deviation of the plural angles based upon the fourth set of points.

41. An apparatus according to claim 24, further comprising:

twenty-first calculating means for calculating a first mean of the first set of plural angels, wherein the first estimate of the skew angle is based upon said first mean;

twenty-second calculating means for calculating a first standard deviation of the first set of plural angles, wherein the first standard deviation is the reliability indicator of the first estimate of the skew angle;

twenty-third calculating means for calculating a second mean of the second set of plural angles, wherein the second estimate of the skew angle is based upon second mean; and twenty-fourth calculating means for calculating a second standard deviation of the second set of plural angles, wherein the second standard deviation is the reliability indicator of the second estimate of the skew angle.

42. An apparatus according to claim 41, wherein the best reliability indicator is the least standard deviation from among the first and second standard deviations, with a corresponding mean and minimum angle.

43. An apparatus according to claim 42, wherein the bitmap image skew angle is the mean angle corresponding to the least standard deviation, from among the first and second standard deviations.

44. An apparatus according to claim 43, wherein the bitmap image skew angle is the minimum angle corresponding to the least standard deviation from among the first and second standard deviations.

45. And apparatus according to claim 24, further comprising of:

obtaining means for obtaining a first set of points from the bitmap image, wherein the first set of points comprising of image pixels first encountered when a set of parallel lines are traversed in a first direction from background pixels to image pixels;

twenty-fifth calculating means for calculating a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

obtaining means for obtaining a second set of points from the bitmap image, wherein the second set of points comprising of image pixels first encountered when a second set of parallel lines are traversed in a second direction from background pixels to image pixels;

twenty-sixth calculating means for calculating a second estimate of the skew angle and a corresponding second estimate of reliability, wherein the second estimate of the skew angle is based upon the second mean of plural angles, derived from the coordinates of the second set of points and determined by inverse tangent, and the second estimate of reliability is based upon the standard deviation of the plural angles based upon the second set of points.

46. An apparatus for determining the skew angle of a bitmap image comprised of background and image pixels, comprising:

a memory for storing computer executable process steps; and a processor for executing the process steps in said memory, wherein said process steps include steps to calculate a first estimate of the skew angle for a first side of the bitmap image and a corresponding first reliability indicator, both the first estimate of the skew angle and the first reliability indicator being based on a first set of plural angles which are calculated at a plurality of positions along the first side, the first set of plural angles being based on the position of image pixels closest to the first side, calculate a second estimate of the skew angle for a second side of the bitmap image and a corresponding second reliability indicator, both the second estimate of the skew angle and the second reliability indicator being based on a second set of plural angles which are calculated at a plurality of positions along the second side, the second set of plural angles being based on the position of image pixels closest to the second side, and determine the skew angle in accordance with which of the first and second estimates has the better reliability indicator.

47. An apparatus according to claim 46, wherein the process steps further include steps to calculate a third estimate of the skew angle for a third side of the bitmap image and a corresponding third reliability indicator, both the third estimate of the skew angle and the third reliability indicator being based on a third set of plural angles which are calculated at a plurality of positions along the third side, the third set of plural angles being based on the position of image pixels closest to the third side, calculate a fourth estimate of the skew angle for a fourth side of the bitmap image and a corresponding fourth reliability indicator, both the fourth estimate of the skew angle and the fourth reliability indicator being based on a fourth set of plural angles which are calculated at a plurality of positions along the fourth side, the fourth set of plural angles being based on the position of image pixels closest to the fourth side.

48. An apparatus according to claim 47, wherein the process steps further include steps to calculate the first set of plural angles by inverse tangent, based upon the positions of image pixels closest to the first side at a plurality of positions along the first side, calculate the second set of plural angles by inverse tangent, based upon the positions of image pixels closest to the second side at a plurality of positions along the second side, calculate the third set of plural angles by inverse tangent, based upon the positions of image pixels closest to the third side at a plurality of positions along the third side and calculate the fourth set of plural angles by inverse tangent, based upon the positions of image pixels closest to the fourth side at a plurality of positions along the fourth side.

49. An apparatus according to claim 48 wherein the process steps further include steps to calculate a first mean of the first set of plural angles, wherein the first estimate of the skew angle is based upon the first mean, calculate a first standard deviation of the first set of plural angles, wherein the first standard deviation is the reliability indicator for the first estimate of the skew angle, calculate a second mean of the second set of plural angles, wherein the second estimate of the skew angle is based upon the second mean, calculate a second standard deviation of the second set of plural angles, wherein the second standard deviation is the reliability indicator of the second estimate of the skew angle, calculate a third mean of the third set of plural angles, wherein the third estimate of the skew angle is based upon the third mean, calculate a third standard deviation of the third set of plural angles, wherein the third standard deviation is the reliability indicator of the third estimate of the skew angle, and calculate a fourth mean of the fourth set of plural angles, wherein the fourth estimate of the skew angle is based upon the fourth mean, and calculate a fourth standard deviation of the fourth set of plural angles, wherein the fourth standard deviation is the reliability indicator of the fourth estimate of the skew angle.

50. An apparatus according to claim 49, wherein the best reliability indicator is the least standard deviation from among the first, second, third and fourth standard deviations, with a corresponding mean and a minimum angle.

51. An apparatus according to claim 50, wherein the bitmap image skew angle is the mean angle corresponding to the least standard deviation, from among the first, second, third and fourth standard deviation.

52. An apparatus according to claim 51, wherein the bitmap image skew angle is the minimum angle corresponding to the least standard deviation from among the first, second, third and fourth standard deviations.

53. An apparatus according to claim 46, wherein the background pixels are white.

54. An apparatus according to claim 46, wherein the image pixels are not all white.

55. An apparatus according to claim 53, wherein the background pixels are of a different color than white.

56. An apparatus according to claim 55, wherein the image pixels are of a different color than the background pixels.

57. An apparatus according to claim 46, wherein the process steps further include the steps to preprocess the bitmap image prior to determining the skew angle, by applying a filter, wherein said filter is a median filter, and sub-sample said bit map image prior to calculating the bit map skew angle.

58. An apparatus according to claim 46, wherein said process steps include steps to obtain a first set of points from the bitmap image, wherein the first set of points comprises of image pixels first encountered when a set of parallel lines are traversed in a first direction from background pixels to image pixels, calculate a first estimate of the skew angle and a corresponding first estimate of reliability, based upon plural angles derived from the first set of points, obtain a second set of points from the bitmap image, wherein the second set of points comprises of image pixels first encountered when a second set of parallel lines are traversed in a second direction from background pixels to image pixels; calculate a second estimate of the skew angle and a corresponding second estimate of reliability based upon plural angles derived from the second set of points, obtain a third set of points from the bitmap image, wherein the third set of points comprises of image pixels first encountered when a third set of parallel lines are traversed in a third direction from background pixels to image pixels, calculate a third estimate of the skew angle and a corresponding third estimate of reliability based upon plural angles derived from the third set of points, obtain a fourth set of points from the bitmap image, wherein the fourth set of points comprises of image pixels first encountered when a fourth set of parallel lines are traversed in a fourth direction from background pixels to image pixels and calculate a fourth estimate of the skew angle and a corresponding fourth estimate of reliability based upon plural angles derived from the fourth set of points and determine the bitmap image skew angle based upon the best estimate of reliability.

59. An apparatus according to claim 46, wherein the process steps further include steps to calculate a first set of plural angles by inverse tangent, based upon the positions of image pixels closest to the first side at a plurality of positions along the first side and calculate a second set of plural angles by inverse tangent, based upon the positions of image pixels closest to the second side at a plurality of positions along the second side.

60. An apparatus according to claim 59 wherein the process steps further include steps to calculate a first mean of the first set of plural angles, wherein the first estimate of the skew angle is based upon the first mean, calculate a first standard deviation of the first set of plural angles, wherein the first standard deviation is the reliability indicator for the first estimate of the skew angle, calculate a second mean of the second set of plural angles, wherein the second estimate of the skew angle is based upon the second mean, and calculate a second standard deviation of the second set of plural angles, wherein the second standard deviation is the reliability indicator of the second estimate of the skew angle.

61. An apparatus according to claim 60, wherein the best reliability indicator is the least standard deviation from among the first and second standard deviations, with a corresponding mean and a minimum angle.

62. An apparatus according to claim 61, wherein the bitmap image skew angle is the mean angle corresponding to the least standard deviation, from among the first and second standard deviation.

63. An apparatus according to claim 62, wherein the bitmap image skew angle is the minimum angle corresponding to the least standard deviation from among the first and second standard deviations.

64. An apparatus according to claim 46, wherein said process steps include steps to obtain a first set of points from the bitmap image, wherein the first set of points comprises of image pixels first encountered when a set of parallel lines are traversed in a first direction from background pixels to image pixels, calculate a first estimate of the skew angle and a corresponding first estimate of reliability, based upon plural angles derived from the first set of points, obtain a second set of points from the bitmap image, wherein the second set of points comprises of image pixels first encountered when a second set of parallel lines are traversed in a second direction from background pixels to image pixels and calculate a second estimate of the skew angle and a corresponding second estimate of reliability based upon plural angles derived from the second set of points.

65. Computer-executable process steps stored on a computer readable medium, said process steps for determining the skew angle of a bitmap image comprised of background and image pixels, said process steps comprising:

code to calculate a first estimate of the skew angle for a first side of the bitmap image and a corresponding first reliability indicator, both the first estimate of skew angle and the first reliability indicator being based on a first set of plural angles which are calculated at a plurality of positions along the first side, the first set of plural angles being based on the position of image pixels closest to the first side;

code to calculate a second estimate of the skew angle for a second side of the bitmap image and a corresponding second reliability indicator, both the second estimate of the skew angle and the second reliability indicator being based on a second set of plural angles which are calculated at a plurality of positions along the second side, the second set of plural angles being based on the position of image pixels closest to the second side; and code to determine the skew angle in accordance with which of the first and second estimates has the better reliability indicator.

66. Computer-executable process steps according to claim 65, further comprising of:

code to calculate a third estimate of the skew angle for a third side of the bitmap image and a corresponding third reliability indicator, both the third estimate of the skew angle and the third reliability indicator being based on a third set of plural angles which are calculated at a plurality of positions along the third side, the third set of plural angles being based on the position of image pixels closest to the third side; and code to calculate a fourth estimate of the skew angle for a fourth side of the bitmap image and a corresponding fourth reliability indicator, both the fourth estimate of the skew angle and the fourth reliability indicator being based on a fourth set of plural angles which are calculated at a plurality of positions along the fourth side, the fourth set of plural angles being based on the position of image pixels closest to the fourth side.

67. Computer-executable process steps according to claim 66, further comprising of:

code to calculate the first set of plural angles by inverse tangent, based upon the position of image pixels closest to the first side at a plurality of positions along the first side;

code to calculate the second set of plural angles by inverse tangent, based upon the position of image pixels closest to the second side at a plurality of positions along the second side;

code to calculate the third set of plural angles by inverse tangent, based upon the position of image pixels closest to the third side at a plurality of positions along the third side, by inverse tangent;

code to calculate the fourth set of plural angles by inverse tangent, based upon the position of image pixels closest to the fourth side at a plurality of positions along the fourth side;

code to calculate a first mean of the first set of plural angles, wherein the first estimate of the skew angle is based upon said first mean;

code to calculate a first standard deviation of the first set of plural angles, wherein the first standard deviation is the reliability indicator of the first estimate of the skew angle;

code to calculate a second mean of the second set plural angles, wherein the second estimate of the skew angle is based upon said second mean;

code to calculate a second standard deviation of the second set of plural angles, wherein the second standard deviation is the reliability indicator of the second estimate of the skew angle;

code to calculate a third mean of third set of plural angles, wherein the third estimate of the skew angle is based upon said third mean; and code to calculate a third standard deviation of the third set of plural angles, wherein the third standard deviation is the reliability indicator of the third estimate of the skew angle;

code to calculate a fourth mean of the fourth set of plural angles, wherein the fourth estimate of the skew angle is based upon said fourth mean; and code to calculate a fourth standard deviation of the fourth set of plural angles, wherein the fourth standard deviation is the reliability indicator of the fourth estimate of the skew angle.

68. Computer-executable process steps according to claim 67, wherein the best confidence indicator is the least standard deviation from among the first, second, third and fourth standard deviations, with a corresponding mean and minimum angle.

69. Computer-executable process steps according to claim 68, wherein the bitmap image skew angle is the mean angle corresponding to the least standard deviation, from among the first, second, third and fourth standard deviations.

70. Computer-executable process steps according to claim 68, wherein the bitmap image skew angle is the minimum angle corresponding to the least standard deviation from among the first, second, third and fourth standard deviations.

71. Computer-executable process steps according to claim 65, wherein the background pixels are white.

72. Computer-executable process steps according to claim 65, wherein the image pixels are not all white.

73. Computer-executable process steps according to claim 71, wherein the background pixels are non-white.

74. Computer-executable process steps according to claim 73, wherein the image pixels are of a different color than the background pixels.

75. Computer-executable process steps according to claim 65, further comprising of:

code to pre-process the bitmap image prior to calculating the skew angle, by applying a filter, wherein said filter is a median filter.

76. Computer-executable process steps according to claim 65, further comprising of:

code to sub-sample said bit map image prior to calculating the bit map image skew angle.

77. Computer-executable process steps according to claim 65, further comprising of:

code to deskew the bitmap image based upon the bitmap image skew angle.

78. Computer-executable process steps according to claim 77, further comprising of:

code to auto-crop the de-skewed bitmap.

79. Computer12-executable process steps according to claim 65, further comprising:

code to obtain a first set of points from the bitmap image, wherein the first set of points comprises of image pixels first encountered when a set of parallel lines are traversed in a first direction from background pixels to image pixels;

code to calculate a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

code to obtain a second set of points from the bitmap image, wherein the second set of points comprises of image pixels first encountered when a second set of parallel lines are traversed in a second direction from background pixels to image pixels;

code to calculate a second estimate of the skew angle and a corresponding second estimate of reliability, wherein the second estimate of the skew angle is based upon a second mean of plural angles, derived from the coordinates of the second set of points and determined by inverse tangent, and the second estimate of reliability is based upon the standard deviation of the plural angles based upon the second set of points;

code to obtain a third set of points from the bitmap image, wherein the third set of points comprises of image pixels first encountered when a third set of parallel lines are traversed in a third direction from background pixels to image pixels;

code to calculate a third estimate of the skew angle and a corresponding third estimate of reliability, wherein the third estimate of the skew angle is based upon a mean of plural angles derived from the coordinates of the third set of points and determined by inverse tangent, and the third estimate of reliability is based upon the standard deviation of the plural angles based upon the third set of points;

code to obtain a fourth set of points from the bitmap image, wherein the fourth set of points comprises of image pixels first encountered when a fourth set of parallel lines are traversed in a fourth direction from background pixels to image pixels; and code to calculate a fourth estimate of the skew angle and a corresponding fourth estimate of reliability, wherein the fourth estimate of the skew angle is based upon a mean of plural angles derived from the coordinates of the fourth set of points and determined by inverse tangent, and the fourth estimate of reliability is based upon the standard deviation of the plural angles based upon the fourth set of points.

80. Computer-executable process steps according to claim 65, further comprising of:

code to calculate a first set of plural angles by inverse tangent, based upon the position of image pixels closest to the first side at a plurality of positions along the first side;

code to calculate a second set of plural angles by inverse tangent, based upon the position of image pixels closest to the second side at a plurality of positions along the second side;

code to calculate a first mean of the first set of plural angles, wherein the first estimate of the skew angle is based upon said first mean;

code to calculate a first standard deviation of the first set of plural angles, wherein the first standard deviation is the reliability indicator of the first estimate of the skew angle;

code to calculate a second mean of the second set plural angles, wherein the second estimate of the skew angle is based upon said second mean; and code to calculate a second standard deviation of the second set of plural angles, wherein the second standard deviation is the reliability indicator of the second estimate of the skew angle.

81. Computer-executable process steps according to claim 80, wherein the best confidence indicator is the least standard deviation from among the first and second standard deviations, with a corresponding mean and minimum angle.

82. Computer-executable process steps according to claim 81, wherein the bitmap image skew angle is the mean angle corresponding to the least standard deviation, from among the first and second deviations.

83. Computer-executable process steps according to claim 82, wherein the bitmap image skew angle is the minimum angle corresponding to the least standard deviation from among the first, second, third and fourth standard deviations.

84. Computer-executable process steps according to claim 65, further comprising:

code to obtain a first set of points from the bitmap image, wherein the first set of points comprises of image pixels first encountered when a set of parallel lines are traversed in a first direction from background pixels to image pixels;

code to calculate a first estimate of the skew angle and a corresponding first estimate of reliability, wherein the first estimate of the skew angle is based upon the first mean of plural angles derived from the coordinates of the first set of points and determined by inverse tangent, and the first estimate of reliability is based upon the standard deviation of the plural angles based upon the first set of points;

code to obtain a second set of points from the bitmap image, wherein the second set of points comprises of image pixels first encountered when a second set of parallel lines are traversed in a second direction from background pixels to image pixels; and code to calculate a second estimate of the skew angle and a corresponding second estimate of reliability, wherein the second estimate of the skew angle is based upon a second mean of plural angles, derived from the coordinates of the second set of points and determined by inverse tangent, and the second estimate of reliability is based upon the standard deviation of the plural angles based upon the second set of points.

* * * * *

UNITED STATES PATENT AND TRADEMARK OFFICE
CERTIFICATE OF CORRECTION

PATENT NO. : 6,360,026 B1
DATED : March 19, 2002
INVENTOR(S) : Kulkarni et al.

It is certified that error appears in the above-identified patent and that said Letters Patent is hereby corrected as shown below:

Title page,
Item [56], References Cited, U.S. PATENT DOCUMENTS, "Kuzinicki et al" should read -- Kuznicki et al. --; "Trepper" should read -- Tretter --; and "Ishtani" should read -- Ishitani --.

Column 1,
Line 30, "where," should read -- where --.

Column 3,
Lines 3, 5 and 8, "set" should read -- sets --.

Column 5,
Line 22, "instructions" should read -- instruction --.

Column 7,
Line 36, "set" should read -- sets --; and
Line 55, "point" should read -- points --.

Column 8,
Line 5, "al" should read -- σl --;
Line 22, "point" should read -- points --; and
Line 53, "set" should read -- set of --.

Column 9,
Line 17, "set" should read -- set of --; and
Line 50, "estimate" should read -- estimates --.

Column 10,
Line 10, "direction" should read -- directions --;
Line 33, "equation" should read -- equations --;
Line 38, "set" should read -- sets --;
Line 55, "set" should read -- sets --; and "among," should read -- among --.

Column 11,
Line 4, "shows" should read -- show --; and
Line 48, "bitmap bitmap" should read -- bitmap --.

UNITED STATES PATENT AND TRADEMARK OFFICE
CERTIFICATE OF CORRECTION

PATENT NO. : 6,360,026 B1
DATED : March 19, 2002
INVENTOR(S) : Kulkarni et al.

It is certified that error appears in the above-identified patent and that said Letters Patent is hereby corrected as shown below:

Column 12,
Line 8, "comprising" should read -- comprised --;
Line 15, "step" should read -- step --;
Line 21, "pixel" should read -- pixels --;
Line 25, "untill" should read -- until --;
Line 26, "FIG. 9," should read -- FIG. 9 --; and
Line 34, "is" should read -- are --.

Column 14,
Line 22, "deviation" should read -- deviations --;
Lines 41, 44 and 51, "comprising of:" should read -- comprising: --;
Line 47, "comprising" should read -- comprising: --;
Line 48, "of:" should be deleted; and
Lines 53 and 67, "of" (second occurrence) should be deleted.

Column 15,
Lines 13 and 26, "of" (second occurrence) should be deleted; and
Line 43, "and" should be deleted.

Column 16,
Line 8, "deviation." should read -- deviations. --;
Lines 13 and 42, "comprising of:" should read -- comprising: --; and
Lines 15 and 28, "of" (second occurrence) should be deleted.

Column 17,
Lines 19, 53 and 60, "set" should read -- set of --.

Column 18,
Lines 30 and 40, "ing of:" should read -- ing: --;
Line 43, "of" (first occurrence) should be deleted; and
Line 56, "of" should be deleted.

Column 19,
Lines 3 and 16, "of" should be deleted;
Line 32, "angels," should read -- angles, --;
Line 59, "And" should read -- An --;
Line 60, "prising of:" should read -- prising: --; and
Line 63, "of" (first occurrence) should be deleted.

Column 20,
Line 9, "of" should be deleted.

UNITED STATES PATENT AND TRADEMARK OFFICE
CERTIFICATE OF CORRECTION

PATENT NO. : 6,360,026 B1
DATED : March 19, 2002
INVENTOR(S) : Kulkarni et al.

It is certified that error appears in the above-identified patent and that said Letters Patent is hereby corrected as shown below:

Column 21,
Line 39, "deviation." should read -- deviations. --;
Line 62, "of" (first occurrence) should be deleted.

Column 22,
Lines 1, 14 and 62, "of" (second occurrence) should be deleted;
Line 8, "of" should be deleted.
Line 48, "deviation." should read -- deviations. --; and
Line 56, "of" (first occurrence) should be deleted.

Column 23,
Lines 25 and 44, "comprising of:" should read -- comprising: --.

Column 24,
Line 1, "set" should read -- set of --;
Line 10, "mean; and" should read -- mean; --;
Lines 46, 51, 55 and 59, "comprising of:" should read -- comprising: --;
Line 61, "Computer 12-executable" should read -- Computer-executable --; and
Line 64, "of" (second occurrence) should be deleted.

Column 25,
Lines 10, 23 and 36, "of" (second occurrence) should be deleted; and
Line 50, "comprising of:" should read -- comprising --.

Column 26,
Line 8, "set" should read -- set of --; and
Lines 31 and 45, "of" (second occurrence) should be deleted.

Signed and Sealed this

Twenty-ninth Day of April, 2003

JAMES E. ROGAN
*Director of the United States Patent and Trademark Office*